(12) United States Patent
Wray et al.

(10) Patent No.: US 11,120,688 B2
(45) Date of Patent: Sep. 14, 2021

(54) ORIENTATION-ADJUST ACTIONS FOR AUTONOMOUS VEHICLE OPERATIONAL MANAGEMENT

(71) Applicants: Nissan North America, Inc., Franklin, TN (US); The University of Massachusetts, Boston, MA (US)

(72) Inventors: Kyle Hollins Wray, Amherst, MA (US); Stefan Witwicki, San Carlos, CA (US); Shlomo Zilberstein, Amherst, MA (US); Melissa Cefkin, San Jose, CA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 155 days.

(21) Appl. No.: 16/023,710

(22) Filed: Jun. 29, 2018

(65) Prior Publication Data
US 2020/0005645 A1    Jan. 2, 2020

(51) Int. Cl.
*G08G 1/16* (2006.01)
*G05D 1/02* (2020.01)
(Continued)

(52) U.S. Cl.
CPC ............ *G08G 1/166* (2013.01); *G05D 1/0088* (2013.01); *G05D 1/0214* (2013.01); *G05D 2201/0213* (2013.01); *G08G 1/052* (2013.01)

(58) Field of Classification Search
CPC ...... G08G 1/166; G08G 1/052; G05D 1/0088; G05D 1/0214; G05D 2201/0213
(Continued)

(56) References Cited

U.S. PATENT DOCUMENTS

| 4,751,570 A | 6/1988 | Robinson |
| 5,615,116 A | 3/1997 | Gudat et al. |

(Continued)

FOREIGN PATENT DOCUMENTS

| CN | 105620470 A | 6/2016 |
| CN | 105635849 A | 6/2016 |

(Continued)

OTHER PUBLICATIONS

International Application No. PCT/US2017/017493; filed Feb. 10, 2017.

(Continued)

*Primary Examiner* — Maceeh Anwari
(74) *Attorney, Agent, or Firm* — Young Basile Hanlon & MacFarlane, P.C.

(57) ABSTRACT

Traversing, by an autonomous vehicle, a vehicle transportation network, may include identifying a policy for a scenario-specific operational control evaluation model of a distinct vehicle operational scenario, receiving a candidate vehicle control action from the policy, wherein, in response to a determination that an uncertainty value for the distinct vehicle operational scenario exceeds a defined uncertainty threshold, the candidate vehicle control action is an orientation-adjust vehicle control action, and traversing a portion of the vehicle transportation network in accordance with the candidate vehicle control action, wherein the portion of the vehicle transportation network includes the distinct vehicle operational scenario.

16 Claims, 14 Drawing Sheets

(51) Int. Cl.
*G05D 1/00* (2006.01)
*G08G 1/052* (2006.01)

(58) Field of Classification Search
USPC .......................................................... 701/23
See application file for complete search history.

(56) References Cited

U.S. PATENT DOCUMENTS

| | | | |
|---|---|---|---|
| 8,762,006 | B2 | 6/2014 | Miller |
| 8,781,669 | B1 | 7/2014 | Teller et al. |
| 8,849,483 | B2 | 9/2014 | Kuwata et al. |
| 8,884,782 | B2 | 11/2014 | Rubin et al. |
| 9,081,651 | B2 | 7/2015 | Filev et al. |
| 9,103,671 | B1 | 8/2015 | Breed et al. |
| 9,494,439 | B1 | 11/2016 | Ross et al. |
| 9,568,915 | B1 | 2/2017 | Berntorp et al. |
| 9,646,428 | B1 | 5/2017 | Konrardy et al. |
| 9,972,054 | B1 | 5/2018 | Konrardy et al. |
| 10,029,701 | B2 | 7/2018 | Gordon et al. |
| 10,061,326 | B2 | 8/2018 | Gordon et al. |
| 10,126,135 | B2 | 11/2018 | Mortazavi et al. |
| 10,185,998 | B1 | 1/2019 | Konrardy et al. |
| 10,319,039 | B1 | 6/2019 | Konrardy et al. |
| 10,599,155 | B1 | 3/2020 | Konrardy et al. |
| 2004/0068351 | A1 | 4/2004 | Solomon |
| 2005/0057370 | A1 | 3/2005 | Warrior et al. |
| 2007/0021915 | A1 | 1/2007 | Breed et al. |
| 2007/0168096 | A1 | 7/2007 | Boutin |
| 2009/0088916 | A1 | 4/2009 | Elgersma et al. |
| 2009/0140887 | A1 | 6/2009 | Breed et al. |
| 2011/0016067 | A1 | 1/2011 | Levchuk et al. |
| 2012/0150437 | A1 | 6/2012 | Zeng et al. |
| 2012/0233102 | A1 | 9/2012 | James |
| 2012/0290152 | A1 | 11/2012 | Cheung et al. |
| 2014/0136414 | A1 | 5/2014 | Abhyanker |
| 2014/0222277 | A1 | 8/2014 | Tsimhoni et al. |
| 2014/0244114 | A1 | 8/2014 | Matsubara |
| 2014/0309838 | A1 | 10/2014 | Ricci |
| 2015/0039157 | A1 | 2/2015 | Wolfe et al. |
| 2015/0070156 | A1 | 3/2015 | Milburn, Jr. |
| 2015/0081156 | A1 | 3/2015 | Trepagnier et al. |
| 2015/0105961 | A1 | 4/2015 | Callow |
| 2015/0106010 | A1 | 4/2015 | Martin et al. |
| 2015/0153735 | A1 | 6/2015 | Clarke et al. |
| 2015/0183431 | A1 | 7/2015 | Nanami |
| 2015/0210274 | A1 | 7/2015 | Clarke et al. |
| 2015/0253772 | A1 | 9/2015 | Solyom et al. |
| 2015/0329130 | A1 | 11/2015 | Carlson et al. |
| 2015/0345966 | A1* | 12/2015 | Meuleau ............ G01C 21/3453 701/23 |
| 2015/0345967 | A1* | 12/2015 | Meuleau ............ G01C 21/3453 701/25 |
| 2015/0375748 | A1 | 12/2015 | Nagase et al. |
| 2016/0068158 | A1 | 3/2016 | Elwart et al. |
| 2016/0129907 | A1 | 5/2016 | Kim et al. |
| 2016/0161270 | A1 | 6/2016 | Okumura |
| 2016/0209842 | A1 | 7/2016 | Thakur et al. |
| 2016/0209843 | A1 | 7/2016 | Meuleau et al. |
| 2016/0209848 | A1 | 7/2016 | Kojo et al. |
| 2016/0260328 | A1 | 9/2016 | Mishra et al. |
| 2016/0318511 | A1 | 11/2016 | Rangwala |
| 2016/0318515 | A1* | 11/2016 | Laur ............... B60W 30/18154 |
| 2016/0334230 | A1 | 11/2016 | Ross et al. |
| 2016/0334797 | A1 | 11/2016 | Ross et al. |
| 2016/0335892 | A1 | 11/2016 | Okada et al. |
| 2016/0375766 | A1 | 12/2016 | Konet et al. |
| 2016/0375768 | A1 | 12/2016 | Konet et al. |
| 2017/0010108 | A1 | 1/2017 | Shashua |
| 2017/0010617 | A1 | 1/2017 | Shashua et al. |
| 2017/0031361 | A1 | 2/2017 | Olson et al. |
| 2017/0032590 | A1 | 2/2017 | Stefan et al. |
| 2017/0038777 | A1 | 2/2017 | Harvey |
| 2017/0090478 | A1 | 3/2017 | Blayvas et al. |
| 2017/0090480 | A1 | 3/2017 | Ho et al. |
| 2017/0102700 | A1 | 4/2017 | Kozak |
| 2017/0158193 | A1 | 6/2017 | Lopez et al. |
| 2017/0215045 | A1 | 7/2017 | Rasal et al. |
| 2017/0225760 | A1 | 8/2017 | Sidki et al. |
| 2017/0236422 | A1 | 8/2017 | Naka et al. |
| 2017/0261325 | A1 | 9/2017 | Schroeder et al. |
| 2017/0262790 | A1 | 9/2017 | Khasis |
| 2017/0277193 | A1 | 9/2017 | Frazzoli et al. |
| 2017/0329338 | A1 | 11/2017 | Wei et al. |
| 2017/0334451 | A1 | 11/2017 | Asakura et al. |
| 2017/0356746 | A1 | 12/2017 | Iagnemma |
| 2017/0369062 | A1 | 12/2017 | Saigusa et al. |
| 2017/0369067 | A1 | 12/2017 | Saigusa et al. |
| 2018/0004214 | A1 | 1/2018 | Wisniowski et al. |
| 2018/0011494 | A1 | 1/2018 | Zhu et al. |
| 2018/0029500 | A1 | 2/2018 | Katanoda |
| 2018/0046191 | A1 | 2/2018 | Keller et al. |
| 2018/0129206 | A1 | 5/2018 | Harada et al. |
| 2018/0173230 | A1 | 6/2018 | Goldman-Shenhar et al. |
| 2018/0232585 | A1 | 8/2018 | Kim |
| 2018/0290657 | A1 | 10/2018 | Ryne et al. |
| 2018/0341880 | A1 | 11/2018 | Kislovskiy et al. |
| 2018/0342033 | A1 | 11/2018 | Kislovskiy et al. |
| 2018/0348786 | A1 | 12/2018 | Yasui et al. |
| 2018/0349785 | A1 | 12/2018 | Zheng et al. |
| 2018/0373245 | A1 | 12/2018 | Nishi |
| 2019/0047584 | A1 | 2/2019 | Donnelly |
| 2019/0096244 | A1 | 3/2019 | Guruva Reddiar et al. |
| 2019/0129436 | A1 | 5/2019 | Sun et al. |
| 2019/0135281 | A1 | 5/2019 | Miura et al. |
| 2019/0299991 | A1 | 10/2019 | Horii et al. |
| 2019/0317506 | A1 | 10/2019 | Ishioka |
| 2019/0329782 | A1 | 10/2019 | Shalev-Shwartz et al. |
| 2019/0359209 | A1 | 11/2019 | Mizutani et al. |
| 2020/0079377 | A1 | 3/2020 | Yashiro et al. |
| 2020/0097008 | A1 | 3/2020 | Sadat et al. |
| 2020/0279488 | A1 | 9/2020 | Shibasaki |

FOREIGN PATENT DOCUMENTS

| | | |
|---|---|---|
| CN | 106103232 A | 11/2016 |
| CN | 106184223 A | 12/2016 |
| DE | 102012005245 A1 | 9/2012 |
| DE | 102012220134 A1 | 5/2014 |
| DE | 102016203086 A1 | 8/2017 |
| EP | 2084690 A2 | 8/2009 |
| EP | 2902864 A1 | 8/2015 |
| EP | 2958783 A1 | 12/2015 |
| JP | H02-114304 A | 4/1990 |
| JP | 2007179388 A | 7/2007 |
| JP | 2015-199439 A | 11/2015 |
| JP | 2015191273 A | 11/2015 |
| JP | 2016017914 A | 2/2016 |
| JP | 2016139163 A | 8/2016 |
| JP | 201781426 A | 5/2017 |
| RU | 2436167 C1 | 12/2011 |
| WO | 2008/053373 A2 | 5/2008 |
| WO | 2012-172632 A1 | 12/2012 |
| WO | 2014/024336 A1 | 2/2014 |
| WO | 2014/130178 A1 | 8/2014 |
| WO | 2015/052865 A1 | 4/2015 |
| WO | 2015112651 A1 | 7/2015 |
| WO | 2016121572 A1 | 8/2016 |
| WO | 2016124178 A1 | 8/2016 |
| WO | 2016129067 A1 | 8/2016 |
| WO | 2016130719 A2 | 8/2016 |
| WO | 2017/013746 A1 | 1/2017 |
| WO | 2018147872 A1 | 8/2018 |

OTHER PUBLICATIONS

International Application No. PCT/US2017/017502; filed Feb. 10, 2017.

International Application No. PCT/US2017/017516; filed Feb. 10, 2017.

International Application No. PCT/US2017/017527; filed Feb. 10, 2017.

U.S. Appl. No. 15/621,862, filed Jun. 13, 2017.

(56) References Cited

OTHER PUBLICATIONS

Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.
Wray et al., Online Decision-Making for Scalable Autonomous Systems; Conference: Twenty-Sixth International Joint Conference on Artificial Intelligence; Conference Paper—Aug. 2017 ; 7 pages https://www.researchgate.net/publication/318830226_Online_Decision-Making_for_Scalable_Autonomous_Systems.
Wray et al., Online Decision-Making for Scalable Autonomous Systems; Power Point Presentation; Aug. 23, 2017.
Bouton et al., Scalable Decision Making with Sensor Occlusions for Autonomous Driving; 2018 IEEE International Conference on Robotics and Automation (ICRA), Brisbane, Australia, May 21-25, 2018; 6 pages.
Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.
Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.
Extended European Search Report of corresponding application EP 17895657.9; dated Feb. 25, 2020; 9 pages.
Brechtel et al.; Probabilistic decision-making under uncertainty for autonomous driving using continuous POMDPs; In: 2014 IEEE 17th International Conference on Intelligent Transportation Systems (ITSC); Oct. 11, 2014.
Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.
Kala et al.; Motion Planning of Autonomous Vehicles on a Dual Carriageway without Speed Lanes; Electronics; Jan. 13, 2015.
Matthews et al.; Intent Communication between Autonomous Vehicles and Pedestrians; 2015.
Ragi et al.; UAV path planning in a dynamic environment via partially observable Markov decision process; IEEE Transactions on Aerospace and Electronic Systems; Oct. 8, 2013.
Aoki, S. et al., A Merging Protocol for Self-Driving Vehicles, ICCPS, Apr. 2017.

\* cited by examiner

ORIENTATION-ADJUST ACTIONS FOR AUTONOMOUS VEHICLE OPERATIONAL MANAGEMENT

TECHNICAL FIELD

This disclosure relates to autonomous vehicle operational management and autonomous driving.

BACKGROUND

A vehicle, such as an autonomous vehicle, may traverse a portion of a vehicle transportation network. Traversing the portion of the vehicle transportation network may include generating or capturing, such as by a sensor of the vehicle, data, such as data representing an operational environment, or a portion thereof, of the vehicle. Accordingly, a system, method, and apparatus for orientation-adjust vehicle control actions for autonomous vehicle operational management may be advantageous.

SUMMARY

Disclosed herein are aspects, features, elements, implementations, and embodiments of orientation-adjust vehicle control actions for autonomous vehicle operational management.

An aspect of the disclosed embodiments is a method for use in traversing a vehicle transportation network by an autonomous vehicle. Traversing the vehicle transportation network includes operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model. Traversing the vehicle transportation network includes receiving a candidate vehicle control action from the policy for the scenario-specific operational control evaluation module instance, wherein, in response to a determination that an uncertainty value for the distinct vehicle operational scenario exceeds a defined uncertainty threshold, the candidate vehicle control action is an orientation-adjust vehicle control action. Traversing the vehicle transportation network includes traversing a portion of the vehicle transportation network in accordance with the candidate vehicle control action, wherein the portion of the vehicle transportation network includes the distinct vehicle operational scenario.

Another aspect of the disclosed embodiments is an autonomous vehicle including a processor configured to execute instructions stored on a non-transitory computer readable medium to operate a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model. The processor is configured to execute the instructions stored on a non-transitory computer readable medium to receive a candidate vehicle control action from the policy for the scenario-specific operational control evaluation module instance, wherein, in response to a determination that an uncertainty value for the distinct vehicle operational scenario exceeds a defined uncertainty threshold, the candidate vehicle control action is an orientation-adjust vehicle control action. The processor is configured to execute the instructions stored on a non-transitory computer readable medium to traverse a portion of the vehicle transportation network in accordance with the candidate vehicle control action, wherein the portion of the vehicle transportation network includes the distinct vehicle operational scenario.

Another aspect of the disclosed embodiments is a method for use in traversing a vehicle transportation network by an autonomous vehicle. Traversing the vehicle transportation network includes operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model. Traversing the vehicle transportation network includes receiving a candidate vehicle control action from the policy for the scenario-specific operational control evaluation module instance, wherein, in response to a determination that an uncertainty value for the distinct vehicle operational scenario exceeds a defined uncertainty threshold, the candidate vehicle control action is an orientation-adjust vehicle control action. Traversing the vehicle transportation network includes traversing a portion of the vehicle transportation network in accordance with the candidate vehicle control action, wherein the portion of the vehicle transportation network includes the distinct vehicle operational scenario. Traversing the portion of the vehicle transportation network in accordance with the candidate vehicle control action includes in response to a determination that a distance between the autonomous vehicle and the right-of-way boundary location is within an expected distance-to-stationary, controlling the autonomous vehicle to traverse the vehicle transportation network by decelerating. Traversing the portion of the vehicle transportation network in accordance with the candidate vehicle control action includes, in response to a determination that a current location of the autonomous vehicle corresponds with the right-of-way boundary location, controlling the autonomous vehicle to traverse the vehicle transportation network by stopping.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
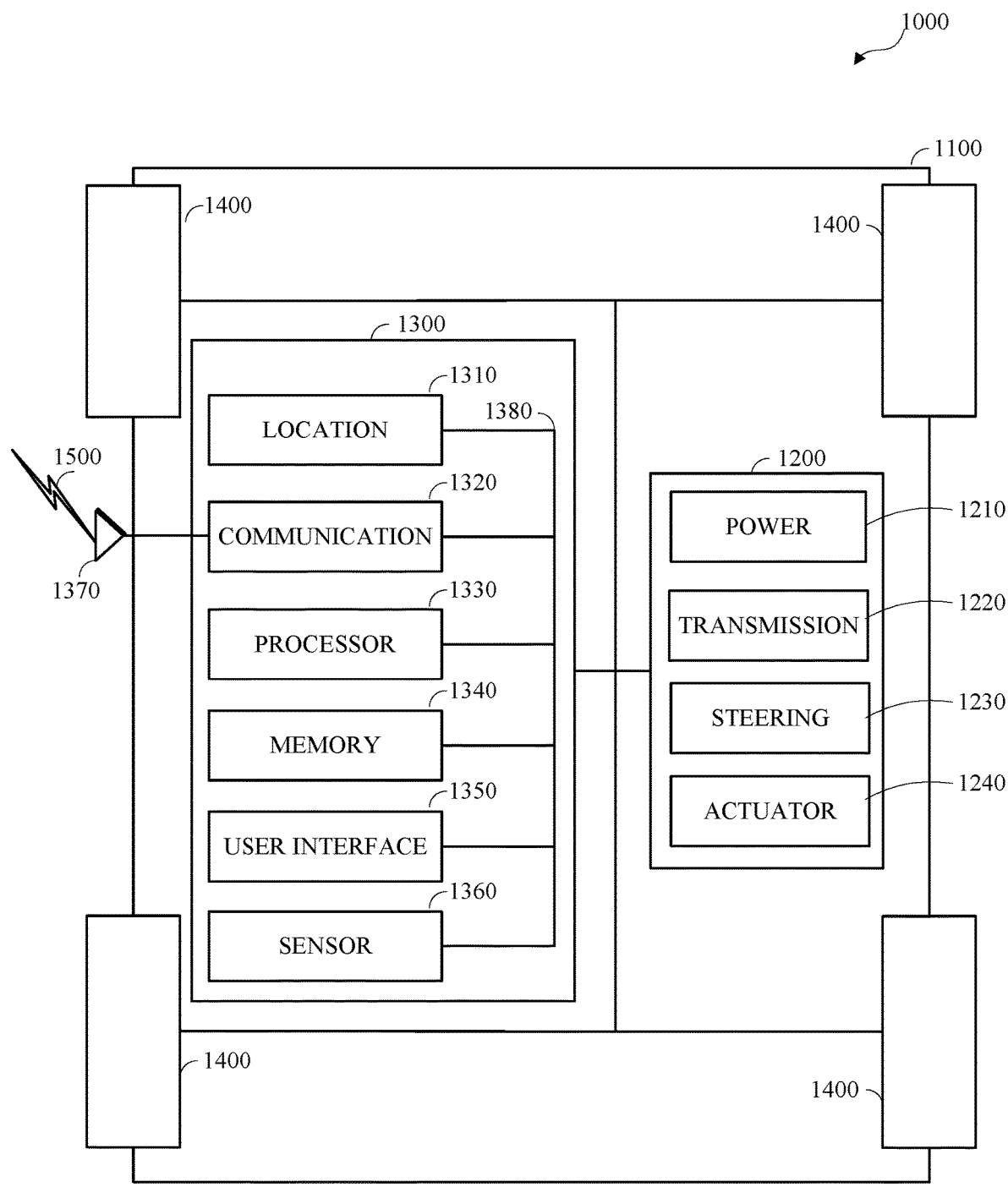
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment data, such as the sensor data, for the autonomous vehicle. The operational environment monitors may include a blocking monitor that may determine probability of availability information for portions of the vehicle transportation network spatiotemporally proximate to the autonomous vehicle. The autonomous vehicle operational management system may include an autonomous vehicle operational management controller, which may detect one or more operational scenarios, such as pedestrian scenarios, intersection scenarios, lane change scenarios, or any other vehicle operational scenario or combination of vehicle operational scenarios, corresponding to the external objects. The autonomous vehicle operational management system may include one or more scenario-specific operational control evaluation modules. Each scenario-specific operational control evaluation module may be a model, such as a Partially Observable Markov Decision Process (POMDP) model, of a respective operational scenario. The autonomous vehicle operational management controller may instantiate respective instances of the scenario-specific operational control evaluation modules in response to detecting the corresponding operational scenarios. The autonomous vehicle operational management controller may receive candidate vehicle control actions from respective instantiated scenario-specific operational control evaluation module instances, may identify a vehicle control action from the candidate vehicle control actions, and may control the autonomous vehicle to traverse a portion of the vehicle transportation network according to the identified vehicle control action.

A distinct vehicle operational scenario may include right-of-way ambiguity corresponding to uncertainty regarding the right-of-way for a right-of-way overlap portion of the vehicle transportation network, such as uncertainty caused by an occlusion, uncertainty regarding the behavior of an external object, or uncertainty regarding the apparent behavior of the autonomous vehicle. The autonomous vehicle may traverse a portion of the vehicle transportation network in accordance with an orientation-adjust vehicle control action, which may include controlling the vehicle to traverse the vehicle transportation network, or a portion thereof, by controlling a kinetic control unit, a trajectory control unit, or a combination of control units, to alter the orientation of the vehicle relative to occlusions, external objects, or both, within defined right-of-way parameters, such as by inching forward slowly, which may reduce the right-of-way uncertainty, such as by edging toward the right-of-way overlap portion of the vehicle transportation network.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

FIG. 1 is a diagram of an example of a vehicle in which the aspects, features, and elements disclosed herein may be implemented. As shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include controlling a kinetic state of the vehicle, such as by accelerating or decelerating, controlling a directional state of the vehicle, such as by steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
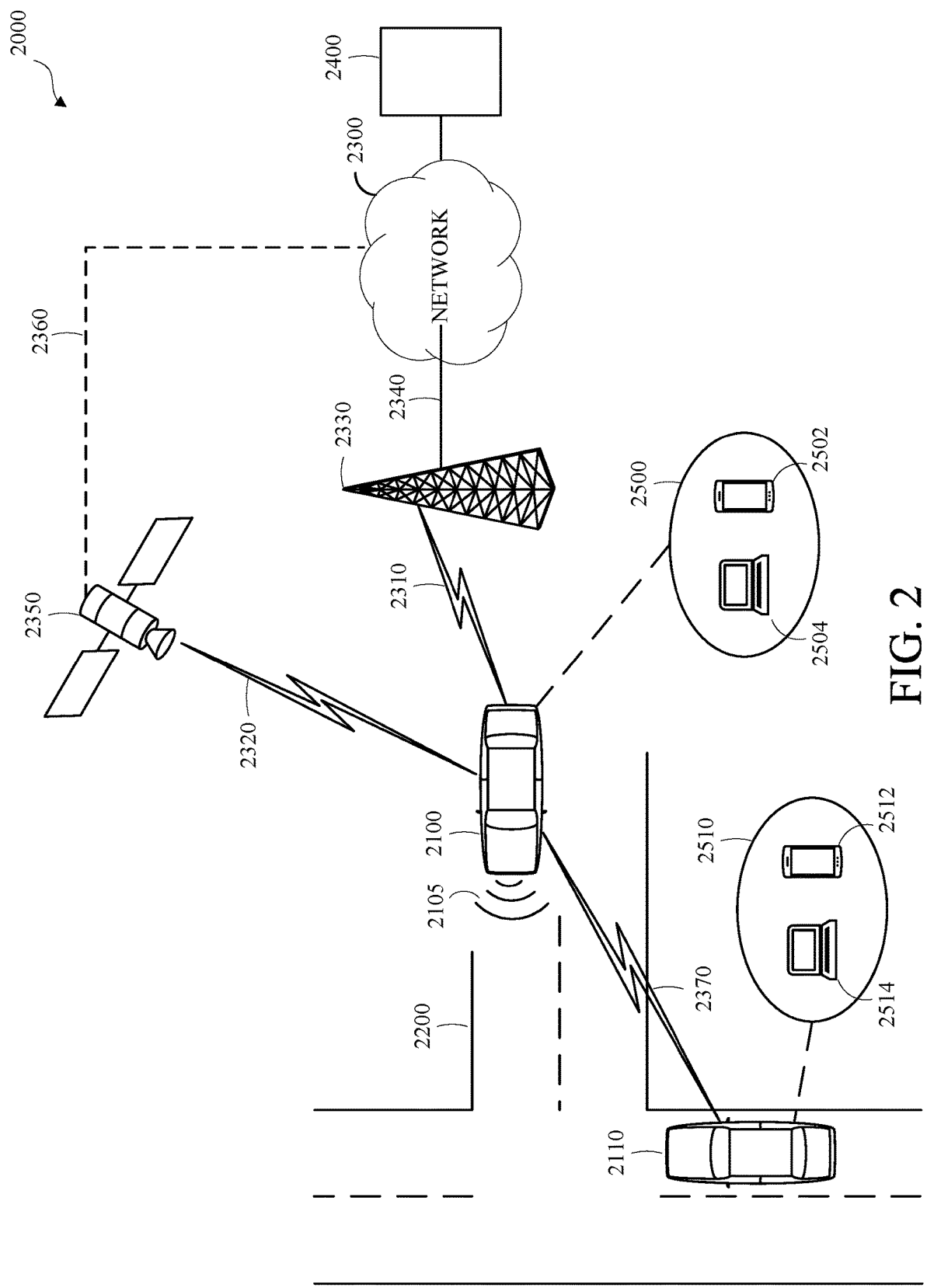
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more communication devices 2400, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and one communication device 2400, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link. Although not shown separately in FIG. 2, a remote vehicle, or other external object, may omit a communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
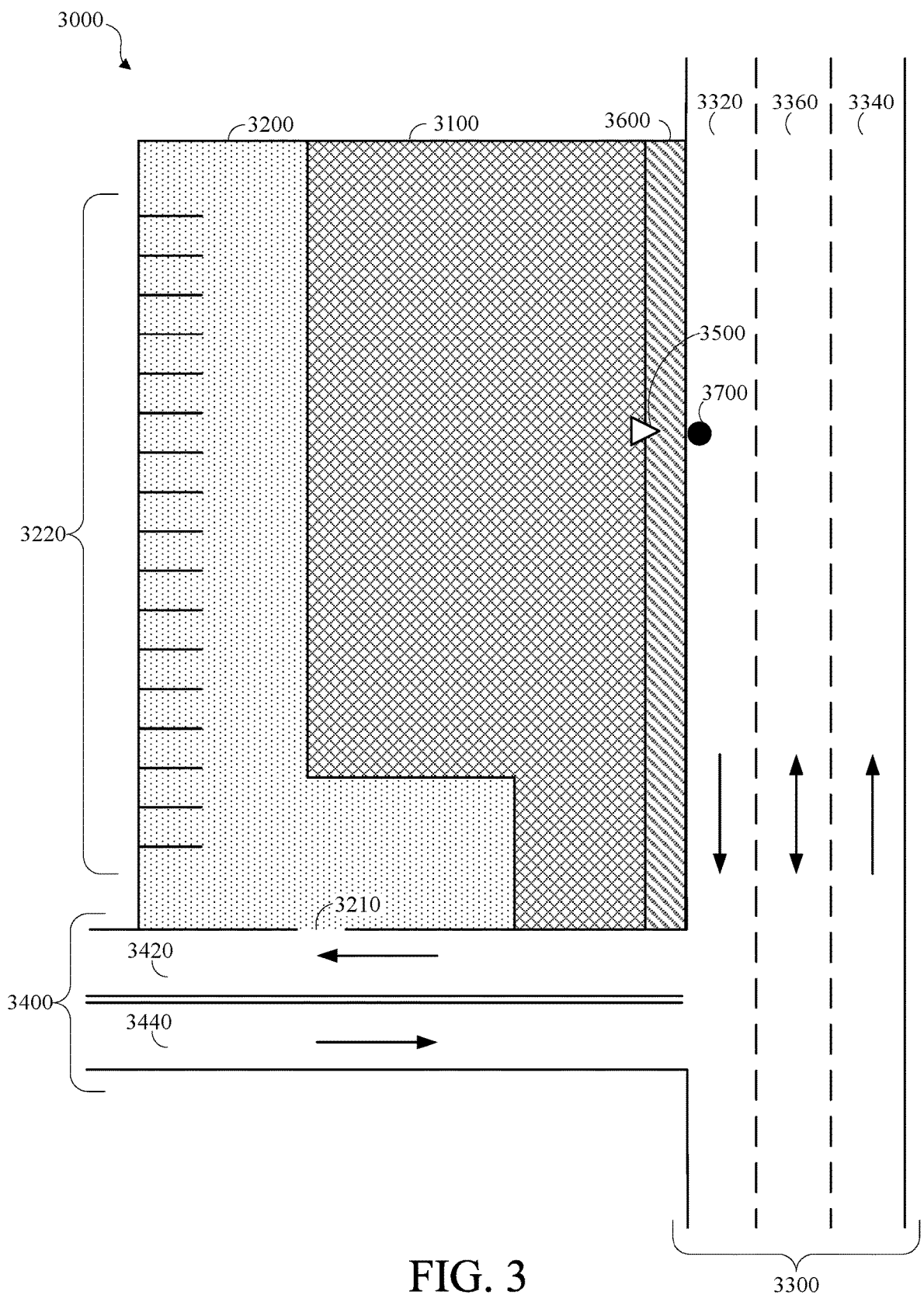
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400. The parking area 3200 may include parking slots 3220.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

A portion, or a combination of portions, of the vehicle transportation network may be identified as a point of interest or a destination. For example, the vehicle transportation network data may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network data may include defined entrance location information, such as information identifying a geolocation of an entrance associated with a destination.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network data may include docking location information, such as information identifying a geolocation of one or more docking locations 3700 associated with a destination. Although not shown separately in FIG. 3, the docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

Figure 4:
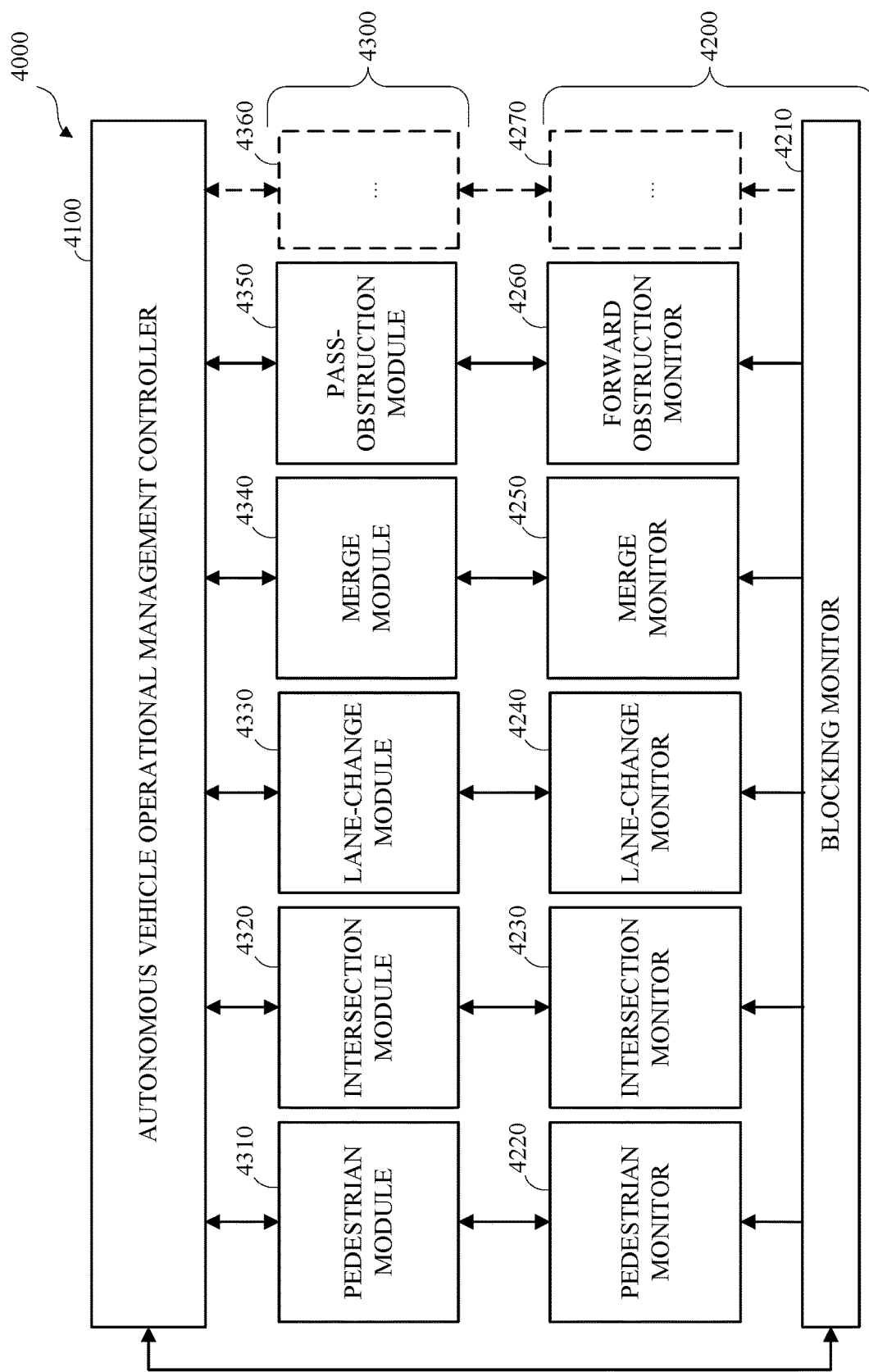
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 4, the autonomous vehicle operational management system 4000 includes an autonomous vehicle operational management controller 4100 (AVOMC), operational environment monitors 4200, and operation control evaluation modules 4300.

The AVOMC 4100, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 4100 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to an identified route for the autonomous vehicle, such as within a defined spatial distance, such as 300 meters, of portions of the vehicle transportation network along the identified route, which may include information indicating the geometry of one or more aspects of the vehicle transportation network, information indicating a condition, such as a surface condition, of the vehicle transportation network, or any combination thereof. The operational environment data may include information representing the vehicle transportation network proximate to the autonomous vehicle, such as within a defined spatial distance of the autonomous vehicle, such as 300 meters, which may include information indicating the geometry of one or more aspects of the vehicle transportation network, information indicating a condition, such as a surface condition, of the vehicle transportation network, or any combination thereof. The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitor the operational environment of the autonomous vehicle may include using operational environment data received from the operational environment monitors 4200.

The operational environment monitors 4200 may include scenario-agnostic monitors, scenario-specific monitors, or a combination thereof. A scenario-agnostic monitor, such as a blocking monitor 4210, may monitor the operational environment of the autonomous vehicle, generate operational environment data representing aspects of the operational environment of the autonomous vehicle, and output the operational environment data to one or more scenario-specific monitor, the AVOMC 4100, or a combination thereof. A scenario-specific monitor, such as a pedestrian monitor 4220, an intersection monitor 4230, a lane-change monitor 4240, a merge monitor 4250, or a forward obstruction monitor 4260, may monitor the operational environment of the autonomous vehicle, generate operational environment data representing scenario-specific aspects of the operational environment of the autonomous vehicle, and output the operational environment data to one or more scenario-specific operation control evaluation modules 4300, the AVOMC 4100, or a combination thereof. For example, the pedestrian monitor 4220 may be an operational environment monitor for monitoring pedestrians, the intersection monitor 4230 may be an operational environment monitor for monitoring intersections, the lane-change monitor 4240 may be an operational environment monitor for monitoring lane-changes, the merge monitor 4250 may be an operational environment monitor for merges, and the forward obstruction monitor 4260 may be an operational environment monitor for monitoring forward obstructions. An operational environment monitor 4270 is shown using broken lines to indicate that the autonomous vehicle operational management system 4000 may include any number of operational environment monitors 4200.

An operational environment monitor 4200 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 4220 may receive, or otherwise access, information, such as sensor data, which may indicate, correspond to, or may otherwise be associated with, one or more pedestrians in the operational environment of the autonomous vehicle. An operational environment monitor 4200 may associate the operational environment data, or a portion thereof, with the operational environment, or an aspect thereof, such as with an external object, such as a pedestrian, a remote vehicle, or an aspect of the vehicle transportation network geometry.

An operational environment monitor 4200 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 4200 may output the information representing the one or more aspects of the operational environment to, or for access by, the AVOMC 4100, such by storing the information representing the one or more aspects of the operational environment in a memory, such as the memory 1340 shown in FIG. 1, of the autonomous vehicle accessible by the AVOMC 4100, sending the information representing the one or more aspects of the operational environment to the AVOMC 4100, or a combination thereof. An operational environment monitor 4200 may output the operational environment data to one or more elements of the autonomous vehicle operational management system 4000, such as the AVOMC 4100. Although not shown in FIG. 4, a scenario-specific operational environment monitor 4220, 4230, 4240, 4250, 4260 may output operational environment data to a scenario-agnostic operational environment monitor, such as the blocking monitor 4210.

The pedestrian monitor 4220 may correlate, associate, or otherwise process the operational environment data to identify, track, or predict actions of one or more pedestrians. For example, the pedestrian monitor 4220 may receive information, such as sensor data, from one or more sensors, which may correspond to one or more pedestrians, the pedestrian monitor 4220 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 4220 may output the identified, associated, or generated pedestrian information to, or for access by, the AVOMC 4100.

The intersection monitor 4230 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 4230 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 4230 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and intersection monitor 4230 may output the identified, associated, or generated intersection information to, or for access by, the AVOMC 4100.

The lane-change monitor 4240 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 4240 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 4240 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles, and the lane-change monitor 4240 may output the identified, associated, or generated lane-change information to, or for access by, the AVOMC 4100.

The merge monitor 4250 may correlate, associate, or otherwise process the operational environment data to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 4250 may associate the sensor data with one or more identified remote vehicles in the operational environment of the autonomous vehicle, one or more aspects of the operational environment of the autonomous vehicle or a combination thereof geospatially corresponding to a merge operation, which may include may identifying a current or expected direction of travel, a path, such as an expected path, a current or expected velocity, a current or expected acceleration rate, or a combination thereof for one or more of the respective identified remote vehicles, and the merge monitor 4250 may output the identified, associated, or generated merge information to, or for access by, the AVOMC 4100.

The forward obstruction monitor 4260 may correlate, associate, or otherwise process the operational environment data to identify one or more aspects of the operational environment of the autonomous vehicle geospatially corresponding to a forward pass-obstruction operation. For example, the forward obstruction monitor 4260 may identify vehicle transportation network geometry in the operational environment of the autonomous vehicle; the forward obstruction monitor 4260 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 4260 may identify, track, or predict actions of one or more remote vehicles in the operational environment of the autonomous vehicle. The forward obstruction monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation, the forward obstruction monitor 4250 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles, and the forward obstruction monitor 4250 may output the identified, associated, or generated forward obstruction information to, or for access by, the AVOMC 4100.

The blocking monitor 4210 may receive operational environment data representing an operational environment, or an aspect thereof, for the autonomous vehicle. The blocking monitor 4210 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 4210 may determine, or update, probabilities of availability continually or periodically. The blocking monitor 4210 may communicate probabilities of availability, or corresponding blocking probabilities, to the AVOMC 4100.

The AVOMC 4100 may identify one or more distinct vehicle operational scenarios based on one or more aspects of the operational environment represented by the operational environment data. For example, the AVOMC 4100 may identify a distinct vehicle operational scenario in response to identifying, or based on, the operational environment data indicated by one or more of the operational environment monitors 4200. The distinct vehicle operational scenario may be identified based on route data, sensor data, or a combination thereof. For example, the AVOMC 4100 may identifying one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 4100 may identify a pedestrian vehicle operational scenario, an intersection vehicle operational scenario, or both.

The AVOMC 4100 may instantiate respective instances of one or more of the operation control evaluation modules 4300 based on one or more aspects of the operational environment represented by the operational environment data. The operation control evaluation modules 4300 may include scenario-specific operation control evaluation modules (SSOCEMs), such as a pedestrian-SSOCEM 4310, an intersection-SSOCEM 4320, a lane-change-SSOCEM 4330, a merge-SSOCEM 4340, a pass-obstruction-SSOCEM 4350, or a combination thereof. A SSOCEM 4360 is shown using broken lines to indicate that the autonomous vehicle operational management system 4000 may include any number of SSOCEMs 4300. For example, the AVOMC 4100 may instantiate an instance of a SSOCEM 4300 in response to identifying a distinct vehicle operational scenario. The AVOMC 4100 may instantiate multiple instances of one or more SSOCEMs 4300 based on one or more aspects of the operational environment represented by the operational environment data. For example, the operational environment data may indicate two pedestrians in the operational environment of the autonomous vehicle and the AVOMC 4100 may instantiate a respective instance of the pedestrian-SSOCEM 4310 for each pedestrian based on one or more aspects of the operational environment represented by the operational environment data.

The AVOMC 4100 may send the operational environment data, or one or more aspects thereof, to another unit of the autonomous vehicle, such as the blocking monitor 4210 or one or more instances of the SSOCEMs 4300. For example, the AVOMC 4100 may communicate the probabilities of availability, or corresponding blocking probabilities, received from the blocking monitor 4210 to respective instantiated instances of the SSOCEMs 4300. The AVOMC 4100 may store the operational environment data, or one or more aspects thereof, such as in a memory, such as the memory 1340 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 4100 may receive one or more candidate vehicle control actions from respective instances of the SSOCEMs 4300. The AVOMC 4100 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as controlling a kinetic state of the vehicle, such as by accelerating, decelerating, or stopping the vehicle, controlling a directional state of the vehicle, such as by steering or turning stopping the vehicle, or any other vehicle operation or combination of vehicle operations that may be performed by the autonomous vehicle in conjunction with traversing a portion of the vehicle transportation network.

For example, a 'stop' vehicle control action may include controlling the vehicle to traverse the vehicle transportation network, or a portion thereof, by controlling a kinetic control unit, a trajectory control unit, or a combination of control units, to stop the vehicle or otherwise control the vehicle to become or remain stationary; a 'Yield' vehicle control action may include controlling the vehicle to traverse the vehicle transportation network, or a portion thereof, by controlling a kinetic control unit, a trajectory control unit, or a combination of control units, to slow the vehicle or otherwise control the vehicle to move at a speed within a defined threshold or range, which may be lower than or within a defined statutory speed limit; an 'orientation-adjust' vehicle control action may include controlling the vehicle to traverse the vehicle transportation network, or a portion thereof, by controlling a kinetic control unit, a trajectory control unit, or a combination of control units, to alter the orientation of the vehicle relative to occlusions, external objects, or both, within defined right-of-way parameters; an 'accelerate' vehicle control action may include controlling the vehicle to traverse the vehicle transportation network, or a portion thereof, by controlling a kinetic control unit, a trajectory control unit, or a combination of control units, to accelerate at a defined acceleration rate, or at an acceleration rate within a defined range; a 'decelerate' vehicle control action may include controlling the vehicle to traverse the vehicle transportation network, or a portion thereof, by controlling a kinetic control unit, a trajectory control unit, or a combination of control units, to decelerate a defined deceleration rate, or at a deceleration rate within a defined range; a 'maintain' vehicle control action may include controlling the vehicle to traverse the vehicle transportation network, or a portion thereof, by controlling a kinetic control unit, a trajectory control unit, or a combination of control units, to maintain current operational parameters, such as by maintaining a current velocity, a current path or route, or a current lane orientation; and a 'proceed' vehicle control action may include controlling the vehicle to traverse the vehicle transportation network, or a portion thereof, by controlling a kinetic control unit, a trajectory control unit, or a combination of control units, to begin or resume a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'orientation-adjust' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'orientation-adjust' vehicle control action includes controlling the autonomous vehicle to slowly inch forward a short distance, such as a few inches or a foot.

The AVOMC 4100 may uninstantiate an instance of a SSOCEM 4300. For example, the AVOMC 4100 may identify a distinct set of operative conditions as indicating a distinct vehicle operational scenario for the autonomous vehicle, instantiate an instance of a SSOCEM 4300 for the distinct vehicle operational scenario, monitor the operative conditions, subsequently determine that one or more of the operative conditions has expired, or has a probability of affecting the operation of the autonomous vehicle below a defined threshold, and the AVOMC 4100 may uninstantiate the instance of the SSOCEM 4300.

The AVOMC 4100 may instantiate and uninstantiate instances of SSOCEMs 4300 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 4300 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 4300 may include one or more models of a respective distinct vehicle operational scenario. The autonomous vehicle operational management system 4000 may include any number of SSOCEMs 4300, each including models of a respective distinct vehicle operational scenario. A SSOCEM 4300 may include one or more models from one or more types of models. For example, a SSOCEM 4300 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 4300 may be ordered, such as hierarchically, such as based on accuracy. For example, a designated model, such as the most accurate model included in an SSOCEM 4300, may be identified as the primary model for the SSOCEM 4300 and other models included in the SSOCEM 4300 may be identified as secondary models.

In an example, one or more of the SSOCEMs 4300 may include a POMDP model, which may be a single-agent model. A POMDP model may model a distinct vehicle operational scenario, which may include modeling uncertainty, using a set of states (S), a set of actions (A), a set of observations ($\Omega$), a set of state transition probabilities (T), a set of conditional observation probabilities (O), a reward function (R), or a combination thereof. A POMDP model may be defined or described as a tuple <S, A, $\Omega$, T, O, R>.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operational scenario. Each state (state space), from a set of states (S) may include one or more defined state factors. Although some examples of state factors for some models are described herein, a model, including any model described herein, may include any number, or cardinality, of state factors. Each state factor may represent a defined aspect of the respective scenario, and may have a respective defined set of values. Although some examples of state factor values for some state factors are described herein, a state factor, including any state factor described herein, may include any number, or cardinality, of values.

An action from the set of actions (A) may indicate an available vehicle control action at each state in the set of states (S). A respective set of actions may be defined for each distinct vehicle operational scenario. Each action (action space), from a set of actions (A) may include one or more defined action factors. Although some examples of action factors for some models are described herein, a model, including any model described herein, may include any number, or cardinality, of action factors. Each action factor may represent an available vehicle control action, and may have a respective defined set of values. Although some examples of action factor values for some action factors are described herein, an action factor, including any action factor described herein, may include any number, or cardinality, of values.

An observation from the set of observations ($\Omega$) may indicate available observable, measurable, or determinable data for each state from the set of states (S). A respective set of observations may be defined for each distinct vehicle operational scenario. Each observation (observation space), from a set of observations ($\Omega$) may include one or more defined observation factors. Although some examples of observation factors for some models are described herein, a model, including any model described herein, may include any number, or cardinality, of observation factors. Each observations factor may represent available observations, and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: $S \times A \times S \rightarrow [0, 1]$. A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (O) may represent probabilities of making respective observations ($\Omega$) based on the operational environment of the autonomous vehicle, as represented by the set of states (S), responsive to the actions of the autonomous vehicle, as represented by the set of actions (A), which may be represented as O: $A \times S \times \Omega \rightarrow [0, 1]$. A respective set of conditional observation probabilities (O) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→☐.

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 4200 may identify occlusions, may identify or determine a probability that an external object is occluded, or hidden, by an identified occlusion, and may include occluded vehicle probability information in the operational environment data output to the AVOMC 4100, and communicated, by the AVOMC 4100, to the respective SSOCEMs 4300.

The autonomous vehicle operational management system 4000 may include any number or combination of types of models. For example, the pedestrian-SSOCEM 4310, the intersection-SSOCEM 4320, the lane-change-SSOCEM 4330, the merge-SSOCEM 4340, and the pass-obstruction-SSOCEM 4350 may be POMDP models. In another example, the pedestrian-SSOCEM 4310 may be a MDP model and the intersection-SSOCEM 4320 may be a POMDP model. The AVOMC 4100 may instantiate any number of instances of the SSOCEMs 4300 based on the operational environment data.

Instantiating a SSOCEM 4300 instance may include identifying a model from the SSOCEM 4300, and instantiating an instance of the identified model. For example, a SSOCEM 4300 may include a primary model and a secondary model for a respective distinct vehicle operational scenario, and instantiating the SSOCEM 4300 may include identifying the primary model as a current model and instantiating an instance of the primary model. Instantiating a model may include determining whether a solution or policy is available for the model. Instantiating a model may include determining whether an available solution or policy for the model is partially solved, or is convergent and solved. Instantiating a SSOCEM 4300 may include instantiating an instance of a solution or policy for the identified model for the SSOCEM 4300.

Solving a model, such as a POMDP model, may include determining a policy or solution, which may be a function, that maximizes an accrued reward, which may be determined by evaluating the possible combinations of the elements of the tuple, such as <S, A, Ω, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states (S), identifying an action from the set of action (A), determining a subsequent, or successor, state from the set of states (S) subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

Figure 5:
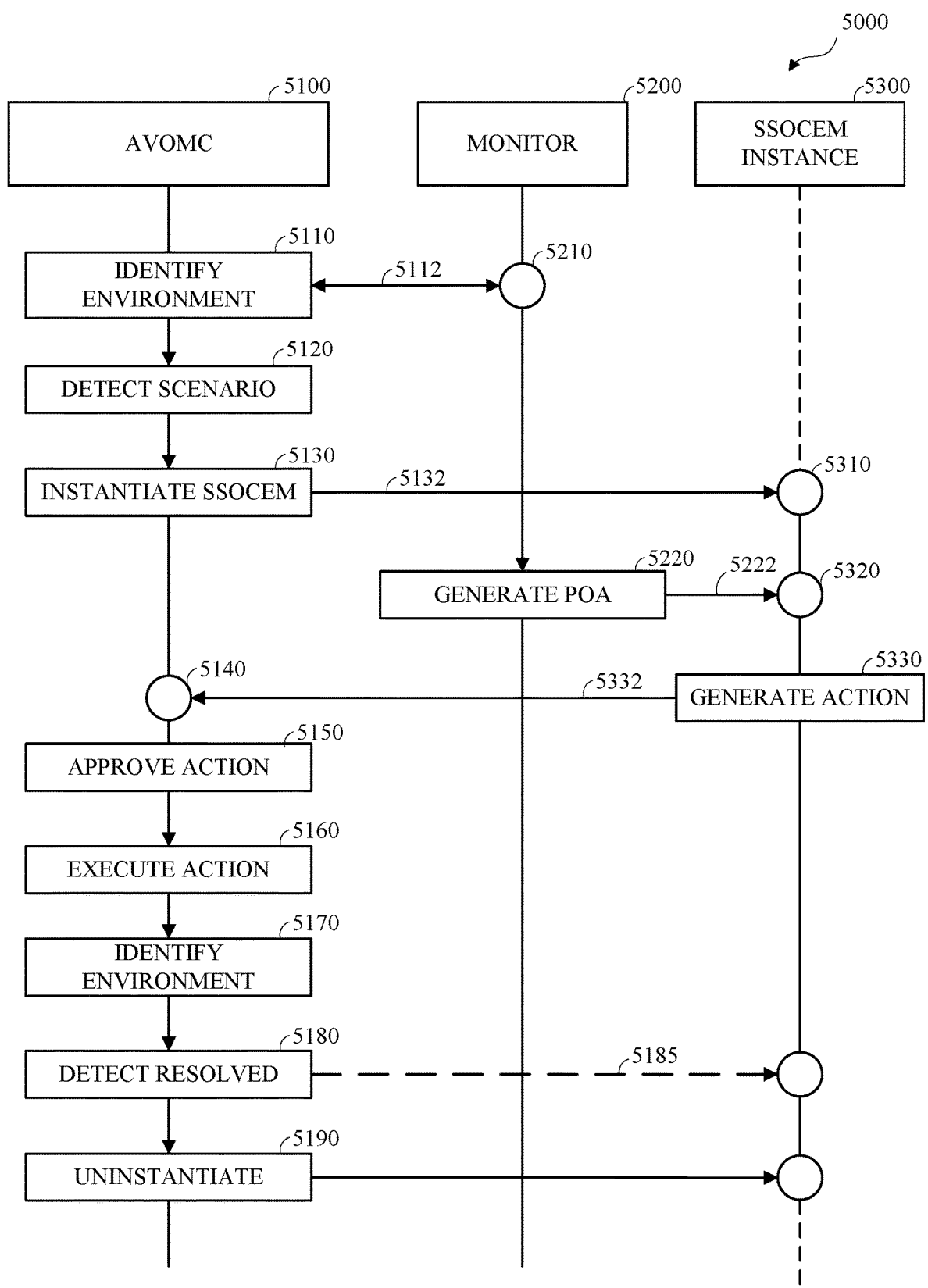
FIG. 5 is a flow diagram of an example of an autonomous vehicle operational management in accordance with embodiments of this disclosure.

FIG. 5 is a flow diagram of an example of autonomous vehicle operational management 5000 in accordance with embodiments of this disclosure. Autonomous vehicle operational management 5000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4.

As shown in FIG. 5, autonomous vehicle operational management 5000 includes implementing or operating the autonomous vehicle operational management system, including one or more modules or components thereof, which may include operating an autonomous vehicle operational management controller (AVOMC) 5100, such as the AVOMC 4100 shown in FIG. 4; operating operational environment monitors 5200, such as one or more of the operational environment monitors 4220, 4230, 4240, 4250, 4260, 4270 shown in FIG. 4; and operating a scenario-specific operational control evaluation module instance (SSOCEM instance) 5300, such as an instance of a SSOCEM 4300 shown in FIG. 4.

The AVOMC 5100 may monitor the operational environment of the autonomous vehicle, or defined aspects thereof, at 5110 to identify an operational environment, or an aspect thereof, of the autonomous vehicle. For example, operational environment monitors 5200 may monitor scenario-specific aspects of the operational environment and may send operational environment data representing the operational environment to the AVOMC 5100. Monitoring the operational environment of the autonomous vehicle may include identifying and tracking external objects at 5110, identifying distinct vehicle operational scenarios at 5120, or a combination thereof. For example, the AVOMC 5100, the operational environment monitors 5200, or both, may identify the operational environment data based on sensor data, vehicle data, route data, vehicle transportation network data, previously identified operational environment data, or any other available data, or combination of data, describing an aspect or aspects of the operational environment.

Identifying the operational environment may include identifying operational environment data representing the operational environment, or one or more aspects thereof. The operational environment data may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, along or proximate to a route identified for the autonomous vehicle, or a combination thereof. The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment data may include receiving information indicating one or more aspects of the operational environment from a sensor of the autonomous vehicle, such as the sensor 1360 shown in FIG. 1 or the on-vehicle sensors 2105 shown in FIG. 2. The sensor, or another unit of the autonomous vehicle, may store the sensor information in a memory, such as the memory 1340 shown in FIG. 1, of the autonomous vehicle and the AVOMC 5100 reading the sensor information from the memory.

Identifying the operational environment data may include identifying information indicating one or more aspects of the operational environment from vehicle transportation network data. For example, the AVOMC 5100 may read, or otherwise receive, vehicle transportation network data indicating that the autonomous vehicle is approaching an intersection, or otherwise describing a geometry or configuration of the vehicle transportation network proximate to the autonomous vehicle, such as within 300 meters of the autonomous vehicle.

Identifying the operational environment data at 5110 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

Identifying the operational environment data may include identifying information indicating one or more aspects of the operational environment from route data representing an identified route for the autonomous vehicle. For example, the AVOMC 5100 may read, or otherwise receive, vehicle transportation network data representing an identified route, such as a route identified in response to user input, for the autonomous vehicle.

The AVOMC 5100 and the operational environment monitors 5200 may communicate to identify the operational environment data as indicated at 5110, 5112, and 5210. Alternatively, or in addition, the operational environment monitors 5200 may receive the operational environment data from another component of the autonomous vehicle, such as from a sensor of the autonomous vehicle or from another operational environment monitor 5200, or the operational environment monitors 5200 may read the operational environment data from a memory of the autonomous vehicle.

The AVOMC 5100 may detect or identify one or more distinct vehicle operational scenarios at 5120, such as based on one or more aspects of the operational environment represented by the operational environment data identified at 5110.

The AVOMC 5100 may instantiate a SSOCEM instance 5300 based on one or more aspects of the operational environment represented by the operational environment data at 5130, such as in response to identifying a distinct vehicle operational scenario at 5120. Although one SSOCEM instance 5300 is shown in FIG. 5, the AVOMC 5100 may instantiate multiple SSOCEM instances 5300 based on one or more aspects of the operational environment represented by the operational environment data identified at 5110, each SSOCEM instance 5300 corresponding to a respective distinct vehicle operational scenario detected at 5120, or a combination of a distinct external object identified at 5110 and a respective distinct vehicle operational scenario detected at 5120. Instantiating a SSOCEM instance 5300 at 5130 may include sending the operational environment data representing an operational environment for the autonomous vehicle to the SSOCEM instance 5300 as indicated at 5132. The SSOCEM instance 5300 may receive the operational environment data representing an operational environment for the autonomous vehicle, or one or more aspects thereof, at 5310. Instantiating a SSOCEM instance 5300 at 5130 may include identifying a model, such as a primary model or a secondary model, of the distinct vehicle operational scenario, instantiating an instance of the model, identifying a solution or policy corresponding to the model, instantiating an instance of the solution or policy, or a combination thereof.

The operational environment monitors 5200 may include a blocking monitor, such as the blocking monitor 4210 shown in FIG. 4, which may determine a respective probability of availability (POA), or corresponding blocking probability, at 5220 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. The blocking monitor may send the probabilities of availability identified at 5220 to the SSOCEM instance 5300 at 5222. Alternatively, or in addition, the blocking monitor may store the probabilities of availability identified at 5220 in a memory of the autonomous vehicle. Although not expressly shown in FIG. 5, the blocking monitor may send the probabilities of availability identified at 5220 to the AVOMC 5100 at 5222 in addition to, or in alternative to, sending the probabilities of availability to the SSOCEM instance 5300. The SSOCEM instance 5300 may receive the probabilities of availability at 5320.

The SSOCEM instance 5300 may generate or identify a candidate vehicle control action at 5330. For example, the SSOCEM instance 5300 may generate or identify the candidate vehicle control action at 5330 in response to receiving the operational environment data 5310, receiving the probability of availability data at 5320, or both. For example, the instance of the solution or policy instantiated at 5310 for the model of the distinct vehicle operational scenario may output the candidate vehicle control action based on the operational environment data, the probability of availability data, or both. The SSOCEM instance 5300 may send the candidate vehicle control action identified at 5330 to the AVOMC 5100 at 5332. Alternatively, or in addition, the SSOCEM instance 5300 may store the candidate vehicle control action identified at 5330 in a memory of the autonomous vehicle.

The AVOMC 5100 may receive a candidate vehicle control action at 5140. For example, the AVOMC 5100 may receive the candidate vehicle control action from the SSOCEM instance 5300 at 5140. Alternatively, or in addition, the AVOMC 5100 may read the candidate vehicle control action from a memory of the autonomous vehicle.

The AVOMC 5100 may approve the candidate vehicle control action, or otherwise identify the candidate vehicle control action as a vehicle control action for controlling the autonomous vehicle to traverse the vehicle transportation network, at 5150. Approving a candidate vehicle control action at 5150 may include determining whether to traverse a portion of the vehicle transportation network in accordance with the candidate vehicle control action.

The AVOMC 5100 may control, or may provide the identified vehicle control action to another vehicle control unit, the autonomous vehicle to traverse the vehicle transportation network, or a portion thereof, at 5160 in accordance with the vehicle control action identified at 5150.

The AVOMC 5100 may identify an operational environment, or an aspect thereof, of the autonomous vehicle at 5170. Identifying an operational environment, or an aspect thereof, of the autonomous vehicle at 5170 may be similar to identifying the operational environment of the autonomous vehicle at 5110 and may include updating previously identified operational environment data.

The AVOMC 5100 may determine or detect whether a distinct vehicle operational scenario is resolved or unresolved at 5180. For example, the AVOMC 5100 may receive operation environment information continuously or on a periodic basis, as described above. The AVOMC 5100 may evaluate the operational environment data to determine whether the distinct vehicle operational scenario has resolved.

The AVOMC 5100 may determine that the distinct vehicle operational scenario corresponding to the SSOCEM instance 5300 is unresolved at 5180, the AVOMC 5100 may send the operational environment data identified at 5170 to the SSOCEM instances 5300 as indicated at 5185, and uninstantiating the SSOCEM instance 5300 at 5180 may be omitted or differed.

The AVOMC 5100 may determine that the distinct vehicle operational scenario is resolved at 5180 and may uninstantiate at 5190 the SSOCEM instances 5300 corresponding to the distinct vehicle operational scenario determined to be resolved at 5180. For example, the AVOMC 5100 may identify a distinct set of operative conditions forming the distinct vehicle operational scenario for the autonomous vehicle at 5120, may determine that one or more of the operative conditions has expired, or has a probability of affecting the operation of the autonomous vehicle below a defined threshold at 5180, and may uninstantiate the corresponding SSOCEM instance 5300.

Although not expressly shown in FIG. 5, the AVOMC 5100 may continuously or periodically repeat identifying or updating the operational environment data at 5170, determining whether the distinct vehicle operational scenario is resolved at 5180, and, in response to determining that the distinct vehicle operational scenario is unresolved at 5180, sending the operational environment data identified at 5170 to the SSOCEM instances 5300 as indicated at 5185, until determining whether the distinct vehicle operational scenario is resolved at 5180 includes determining that the distinct vehicle operational scenario is resolved.

Figure 6:
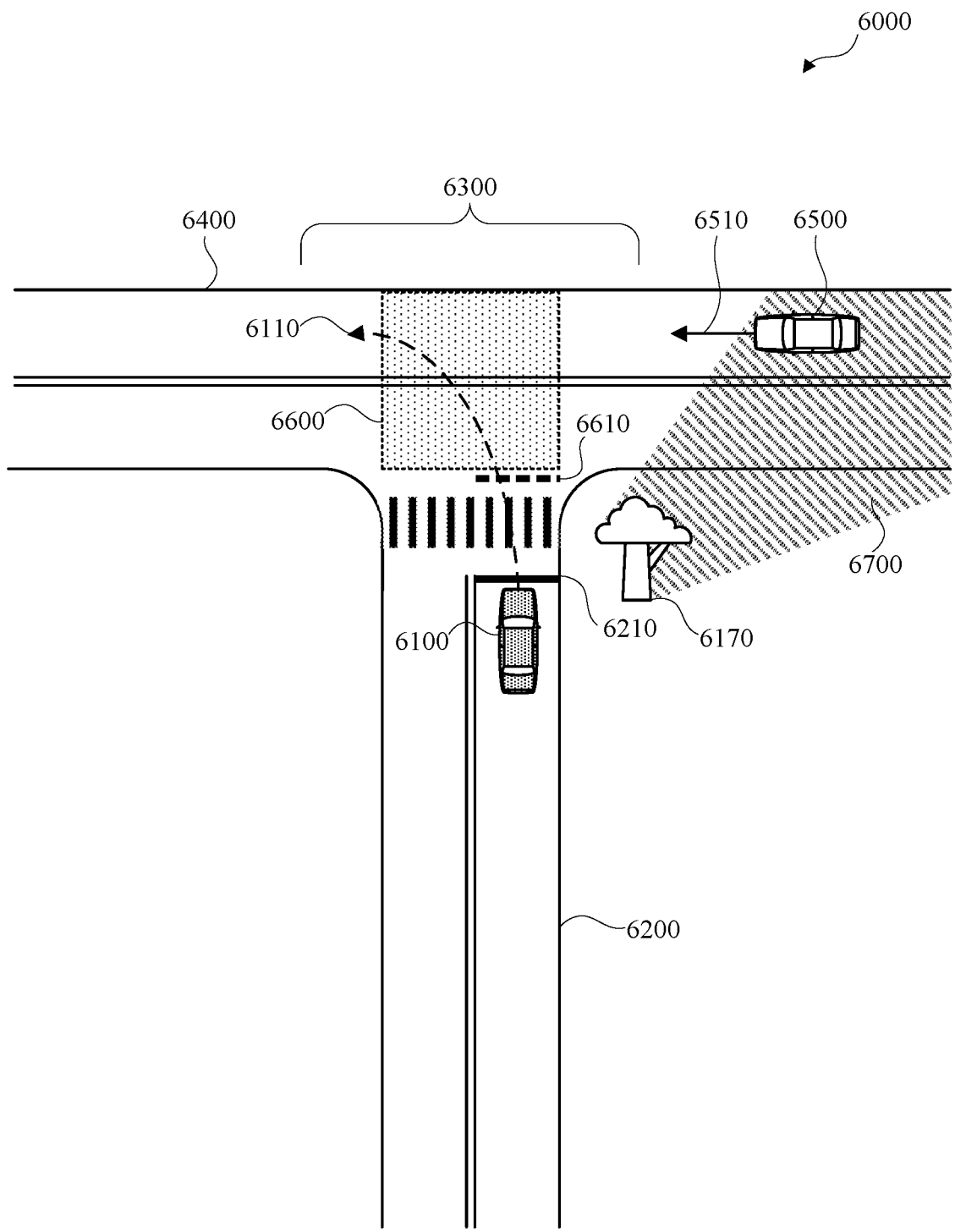
FIG. 6 is a diagram of an example of an intersection scene portion of a vehicle transportation network including an intersection scenario with right-of-way ambiguity in accordance with embodiments of this disclosure.

FIG. 6 is a diagram of an example of an intersection scene 6000 portion of a vehicle transportation network including an intersection scenario with right-of-way ambiguity in accordance with embodiments of this disclosure. Autonomous vehicle operational management may include an autonomous vehicle 6100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 6100 traversing a portion of the vehicle transportation network along a first road 6200 approaching an intersection 6300 with a second road 6400 (intersection scenario). For simplicity and clarity, the portion of the vehicle transportation network corresponding to the intersection scene 6000 shown in FIG. 6 is oriented with north at the top and east at the right.

A remote vehicle 6500 is shown traversing westbound in the second road 6400. A current trajectory 6510 for the remote vehicle 6500 is indicated using a solid directional line. The first road 6200 may include a stop line 6210 proximate to the intersection 6300. Other intersection configurations may be used. For example, the stop line 6210 may be omitted.

The autonomous vehicle operational management system of the autonomous vehicle 6100 may operate an intersection monitor, such as the intersection monitor 4230 shown in FIG. 4, which may include instantiating the intersection monitor. The intersection monitor may process or evaluate vehicle transportation network data, such as map data, sensor data, or a combination thereof, representing a portion of the vehicle transportation network, such as a portion corresponding to an identified route for the autonomous vehicle 6100, a portion spatially proximate to the autonomous vehicle 6100, or an expected path 6110 for the autonomous vehicle 6100, or a combination thereof. The intersection monitor may identify or generate operational environment information representing the operational environment, or an aspect thereof, of the autonomous vehicle 6100, which may include associating the sensor information with the remote vehicle 6500, and may output the operational environment information, which may include information identifying the intersection scenario to the autonomous vehicle operational management controller.

The autonomous vehicle operational management controller may detect or identify the intersection scenario, such as based on the operational environment represented by the operational environment information, which may include the operational environment information output by the intersection monitor. The autonomous vehicle operational management controller may instantiate one or more intersection-SSOCEM instances and may send, or otherwise make available, the operational environment information to the intersection-SSOCEM instances, in response to detecting or identifying intersection scenario. In addition, or in the alternative, the autonomous vehicle operational management controller may send, or otherwise make available, operational environment information, such as new or updated operational environment information, to one or more previously instantiated, or operating, intersection-SSOCEM instances, in response to detecting or identifying intersection scenario.

Instantiating, or updating, the intersection-SSOCEM instance may include providing the operational environment information, or a portion thereof, such as the sensor information or the probabilities of availability, to the respective intersection-SSOCEM instance, such as by sending the operational environment information, or a portion thereof, to the respective intersection-SSOCEM instance, or storing the operational environment information, or a portion thereof, for access by the respective intersection-SSOCEM instance. The respective intersection-SSOCEM instance may receive, or otherwise access, the operational environment information corresponding to the intersection scenario.

The intersection-SSOCEM may include a model of the intersection scenario, such as a POMDP model of the intersection scenario. The POMDP model of the intersection scenario may define a set of states (S), a set of actions (A), a set of observations ($\Omega$), a set of state transition probabilities (T), a set of conditional observation probabilities (O), a reward function (R), or a combination thereof, corresponding to the intersection scenario, which may be expressed as a tuple <S, A, $\Omega$, T, O, R>. A POMDP model of a distinct intersection vehicle operational scenario, may model uncertainty, which may include perceptual uncertainty, behavior uncertainty, or a combination thereof. Modeling perceptual uncertainty may include modeling sensor uncertainty; modeling a probability of false positive remote vehicle identification, such as inaccurately identifying a remote vehicle in the absence of a remote vehicle; modeling a probability of false negative remote vehicle identification, such as inaccurately identifying an absence of a remote vehicle in the presence of a remote vehicle; or a combination thereof. Modeling behavior uncurtaining may include modeling respective probabilities of remote vehicle actions.

Instantiating the intersection-SSOCEM instance may include identifying a solution or policy for a model of the intersection vehicle operational scenario from the intersection-SSOCEM. Identifying the solution or policy for the model of the intersection vehicle operational scenario from the intersection-SSOCEM may include solving the intersection-SSOCEM model. Instantiating the intersection-SSOCEM instance may include instantiating an instance of the solution or policy.

The intersection-SSOCEM solution instance may generate a candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated intersection-SSOCEM instances and may identify a vehicle control action based on the received candidate vehicle control actions for controlling the autonomous vehicle 6100 at the corresponding temporal location and may control the autonomous vehicle to traverse the vehicle transportation network, or a portion thereof, in accordance with the identified vehicle control action.

For the intersection scene 6000 shown in FIG. 6, the autonomous vehicle 6100 may approach the intersection 6300. In some implementations, the autonomous vehicle 6100 may stop, or slow to a minimal speed, such as a speed below a defined maximum orientation-adjust speed, at, or proximate to, a defined approach distance from the right-of-way boundary location 6610, which may correspond with the stop line 6210 as shown.

The autonomous vehicle 6100 may identify a portion of the vehicle transportation network as a right-of-way overlap area 6600. The right-of-way overlap area 6600 may represent a portion of the vehicle transportation network wherein an expected path 6110 for the autonomous vehicle 6100 intersects spatially with a right-of-way path, such as the second road 6400. A right-of-way path may be a path that a vehicle transportation network user having right-of-way may rightfully traverse. For example, a right-of-way path may correspond to a pedestrian walkway, a crossing roadway at an intersection, a merging lane, a two-way road segment, or any other portion of the vehicle transportation network that may be traversed by another vehicle transportation network user on a path that intersects with, or differs from, the expected path 6110 of the autonomous vehicle 6100. A vehicle transportation network user may be any entity or object, such as the autonomous vehicle 6100, a remote vehicle, or a pedestrian, that may traverse any portion of the vehicle transportation network.

Identifying the right-of-way overlap area 6600 may include identifying a right-of-way boundary location 6610 which may be a location in the vehicle transportation network along the expected path 6110 of the autonomous vehicle 6100 between a current location of the autonomous vehicle 6100 and the right-of-way overlap area 6600 proximate to, such as immediately adjacent to or one meter from, the right-of-way overlap area 6600 which may be the closest location in the vehicle transportation network along the expected path 6110 for the autonomous vehicle 6100 to the right-of-way overlap area 6600 that the autonomous vehicle 6100 may safely traverse without entering the right-of-way overlap area 6600.

The operational environment may include an occluded area 6700 (shown using a diagonally lined background), which may include a portion of the vehicle transportation network. For example, the operational environment may include an occlusion 6710, such as a tree (as shown) or another vehicle, which may occlude, such as limit, diminish, or prevent, the autonomous vehicle 6100 from accurately identifying, detecting, or tracking one or more external objects, such as the remote vehicle 6500, in, or partially in, the occluded area 6700 (occluded object). The autonomous vehicle 6100 may identify the occluded area 6700. For example, the autonomous vehicle 6100 may detect the occlusion 6710 and may identify the occluded area 6700 based on the occlusion 6710.

The scenario-specific operational control evaluation model policy may determine that the uncertainty of a current belief state for the distinct vehicle operational scenario exceeds a defined uncertainty threshold. For example, the occluded area 6700 may increase uncertainty regarding the presence of external objects, such as the remote vehicle 6500, in the occluded area 6700.

The scenario-specific operational control evaluation model policy may output an orientation-adjust vehicle control action. The autonomous vehicle 6100 may traverse a portion of the vehicle transportation network in accordance with the orientation-adjust vehicle control action. Traversing the portion of the vehicle transportation network in accordance with the orientation-adjust vehicle control action may reduce uncertainty regarding the right-of-way for the right-of-way overlap area 6600 by adjusting the relative orientation of the autonomous vehicle 6100 relative to the occlusion 6710 and the vehicle transportation network, which may reduce or eliminate the occlusive effect of the occlusion 6710 with respect to vehicle operation.

In some implementations, traversing the portion of the vehicle transportation network in accordance with the orientation-adjust vehicle control action may reduce uncertainty regarding the right-of-way for the right-of-way overlap area 6600 by controlling the autonomous vehicle 6100 to output a semiotic representation, such as the orientation-adjust motion of the autonomous vehicle 6100, of an expected subsequent right-of-way and a corresponding expected subsequent vehicle control action for the autonomous vehicle 6100, such as a proceed vehicle control action to traverse the right-of-way overlap area 6600.

Traversing the portion of the vehicle transportation network in accordance with the orientation-adjust vehicle control action may include traversing the vehicle transportation network from a current location of the autonomous vehicle 6100 toward the boundary location 6610 at a speed within, such as at or below, a defined maximum orientation-adjust speed, such as two meters per second. In some implementations, the autonomous vehicle 6100 may determine whether a current distance between the autonomous vehicle 6100 and the right-of-way boundary location 6610 is within, such as equal to or less than, the defined approach distance. The distance between the autonomous vehicle 6100 and the right-of-way boundary location 6610 may be within the defined approach distance and the autonomous vehicle 6100 may traverse the vehicle transportation network in accordance with the orientation-adjust vehicle control action.

Prior to traversing the vehicle transportation network in accordance with the orientation-adjust vehicle control action, the autonomous vehicle 6100 may be stationary, and traversing the vehicle transportation network in accordance with the orientation-adjust vehicle control action may include accelerating, such as in accordance with a defined acceleration profile, to the maximum orientation-adjust speed. For example, the autonomous vehicle 6100 may be stationary at a current location, such as at the stop line 6210 as shown, the autonomous vehicle may determine that the current location corresponds with the defined approach distance, and the autonomous vehicle may accelerate to the defined maximum orientation-adjust speed in accordance with the orientation-adjust vehicle control action.

Although not expressly shown in FIG. 6, prior to traversing the vehicle transportation network in accordance with the orientation-adjust vehicle control action, the autonomous vehicle 6100 may be in motion at a speed greater than the maximum orientation-adjust speed and traversing the vehicle transportation network in accordance with the orientation-adjust vehicle control action may include decelerating to the maximum orientation-adjust speed in accordance with a defined deceleration profile. For example, the autonomous vehicle 6100 may be in motion at a speed greater than the defined maximum orientation-adjust speed at a current location, such as at the stop line 6210, the autonomous vehicle may determine that the current location corresponds with the defined approach distance, and the autonomous vehicle may decelerate to the defined maximum orientation-adjust speed in accordance with the orientation-adjust vehicle control action.

Traversing the vehicle transportation network in accordance with the orientation-adjust vehicle control action may include determining whether a distance between the current location of the autonomous vehicle 6100 and the right-of-way boundary location 6610 is within, such as equal to or less than, an expected distance-to-stationary. For example, the autonomous vehicle 6100 may determine that the distance between the current location of the autonomous vehicle 6100 and the right-of-way boundary location 6610 is within the expected distance-to-stationary and the autonomous vehicle may traverse the vehicle transportation network by decelerating in accordance with a defined deceleration profiled to stop at, or proximate to, the boundary location 6610. The expected distance-to-stationary may indicate a determined distance for the autonomous vehicle 6100 to transition from an in-motion state to a stationary state. In some implementations, the autonomous vehicle may determine that a current location of the autonomous vehicle 6100 corresponds with the right-of-way boundary location, and the autonomous vehicle may traverse the vehicle transportation network by controlling the autonomous vehicle to be stationary (stopping).

Although not shown in FIG. 6, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 6100 may be located more proximate to the second road 6400 than the stop line 6210, such as proximate to the right-of-way boundary location 6610, which may reduce or eliminate the occlusive effect of the occlusion 6710 with respect to vehicle operation, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a stop vehicle control action. For example, the autonomous vehicle may determine that the remote vehicle 6500 is stationary and that the autonomous vehicle has right-of-way, and the scenario-specific operational control evaluation model policy may output a proceed vehicle control action. In another example, the autonomous vehicle may determine that the remote vehicle 6500 has right-of-way, or is otherwise proceeding through the intersection, and that the autonomous vehicle does not current have the right-of-way, and the scenario-specific operational control evaluation model policy may output a stop vehicle control action.

Figure 7:
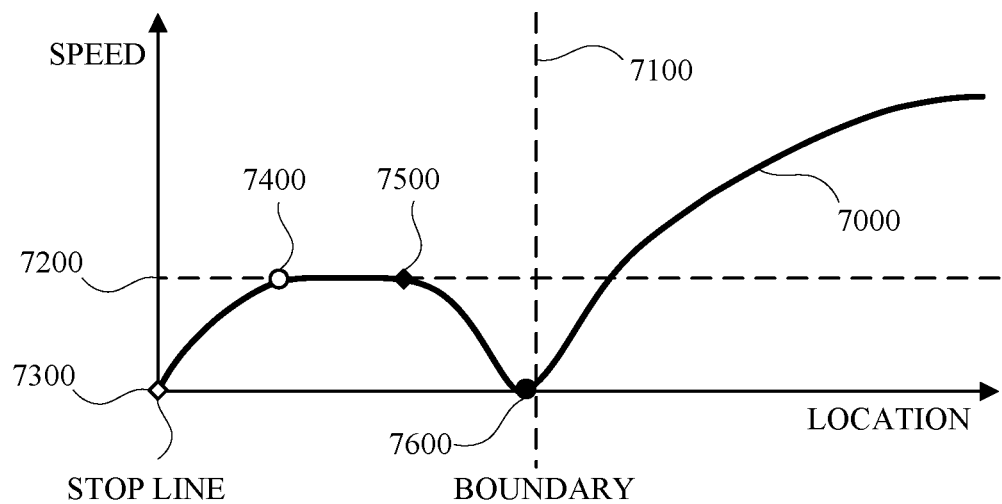
FIG. 7 is a graph of an example of an orientation-adjust vehicle control action speed profile in accordance with embodiments of this disclosure.

FIG. 7 is a graph of an example of an orientation-adjust vehicle control action speed profile 7000 in accordance with embodiments of this disclosure. Autonomous vehicle operational management may include an autonomous vehicle, such as the vehicle 1000 shown in FIG. 1, one of the vehicles 2100/2110 shown in FIG. 2, the autonomous vehicle 6100 shown in FIG. 6, a semi-autonomous vehicle, or any other vehicle implementing autonomous driving, operating an autonomous vehicle operational management system, such as the autonomous vehicle operational management system 4000 shown in FIG. 4, which may include a model of an autonomous vehicle operational control scenario that includes the autonomous vehicle traversing a portion of the vehicle transportation network including an intersection scenario with an occlusion, such as shown in FIG. 6.

The graph shown in FIG. 7 includes a horizontal axis representing a geospatial location of the autonomous vehicle in the vehicle transportation network relative to the intersection. The left end of the horizontal axis corresponds with the defined approach distance, such as the stop line 6210 shown in FIG. 6. Moving from left to right along the horizontal axis corresponds to the autonomous vehicle traversing the intersection. The right end of the horizontal axis corresponds with the autonomous vehicle completing traversal of the intersection. A location corresponding to the right-of-way boundary location 6610 shown in FIG. 6 is indicated in FIG. 7 by a vertical broken line at 7100. The graph shown in FIG. 7 includes a vertical axis representing the speed of the autonomous vehicle. The bottom end of the vertical axis indicates a stationary speed. The maximum orientation-adjust speed is indicated by a horizontal broken line at 7200. The orientation-adjust vehicle control action speed profile 7000 is shown using a bold line.

The autonomous vehicle may approach an intersection scenario with an occlusion, such as shown in FIG. 6. The autonomous vehicle may identify a distinct vehicle operational scenario for the intersection scene portion of a vehicle transportation network shown. The autonomous vehicle may instantiate a policy for a scenario-specific operational control evaluation model of the distinct vehicle operational scenario. The autonomous vehicle may stop, or slow to a minimal speed, such as a speed below a defined maximum orientation-adjust speed, proximate to a stop line or another location greater than a minimum orientation-adjust distance from a right-of-way boundary location, such as shown in FIG. 6. The scenario-specific operational control evaluation model policy may determine that the uncertainty of a current belief state for the distinct vehicle operational scenario exceeds a defined uncertainty threshold. The scenario-specific operational control evaluation model policy may output an orientation-adjust vehicle control action.

The autonomous vehicle may traverse a portion of the vehicle transportation network in accordance with the orientation-adjust vehicle control action, which may include traversing the vehicle transportation network from a current location of the autonomous vehicle toward the boundary location as represented in the speed profile 7000 shown in FIG. 7. As shown at the left side of FIG. 7, the autonomous vehicle may be stationary at the defined approach distance (stop line) and traversing the vehicle transportation network in accordance with the orientation-adjust vehicle control action may include accelerating from a stationary state as indicated by the white diamond at 7300 to the maximum orientation-adjust speed 7200 as indicated by the white circle at 7400. Although FIG. 7 shows the autonomous vehicle accelerating from a stationary state at 7200, the autonomous vehicle may accelerate from a non-stationary speed within the maximum orientation-adjust speed at the defined approach distance (stop line), may be at the maximum orientation-adjust speed at the defined approach distance (stop line) and may maintain the maximum orientation-adjust speed, or may be at a speed greater than the maximum orientation-adjust speed at the defined approach distance (stop line) and may decelerate to the maximum orientation-adjust speed.

The autonomous vehicle may traverse a portion of the vehicle transportation network at the maximum orientation-adjust speed 7200. The autonomous vehicle may determine an expected distance-to-stationary and may determine whether a current distance between a current location of the autonomous vehicle and the right-of-way boundary location 7100 is within, such as equal to or less than, the expected distance-to-stationary. The autonomous vehicle may determine that the current distance between the current location of the autonomous vehicle and the right-of-way boundary location 7100 is within, such as equal to or less than, the expected distance-to-stationary and may decelerate as indicated by the black diamond at 7500 to a stationary state as indicated by the black circle at 7600 in accordance with the right-of-way boundary location 7100.

The scenario-specific operational control evaluation model policy may subsequently determine that the uncertainty of a current belief state for the distinct vehicle operational scenario is within the defined uncertainty threshold. The scenario-specific operational control evaluation model policy may output a proceed vehicle control action. The autonomous vehicle may traverse a portion of the vehicle transportation network in accordance with the proceed vehicle control action, which may include traversing the vehicle transportation network from a current location of the autonomous vehicle by accelerating as indicated to the right of the black circle at 7600.

Although not expressly shown in FIG. 7, prior to the autonomous vehicle reaching the location indicated by the black circle 7600, the scenario-specific operational control evaluation model policy may determine that the uncertainty of a current belief state for the distinct vehicle operational scenario is within the defined uncertainty threshold and that the autonomous vehicle has right-of-way, and may output a proceed vehicle control action, and the autonomous vehicle may traverse a portion of the vehicle transportation network in accordance with the proceed vehicle control action by accelerating at a location between the stop line and the boundary.

Although not expressly shown in FIG. 7, prior to the autonomous vehicle reaching the location indicated by the black diamond 7500, the scenario-specific operational control evaluation model policy may determine that the uncertainty of a current belief state for the distinct vehicle operational scenario is within the defined uncertainty threshold and that the autonomous vehicle does not have right-of-way, and may output a stop vehicle control action, and the autonomous vehicle may traverse a portion of the vehicle transportation network in accordance with the stop vehicle control action by decelerating to stationary at a location between the stop line and the boundary.

Figure 8:
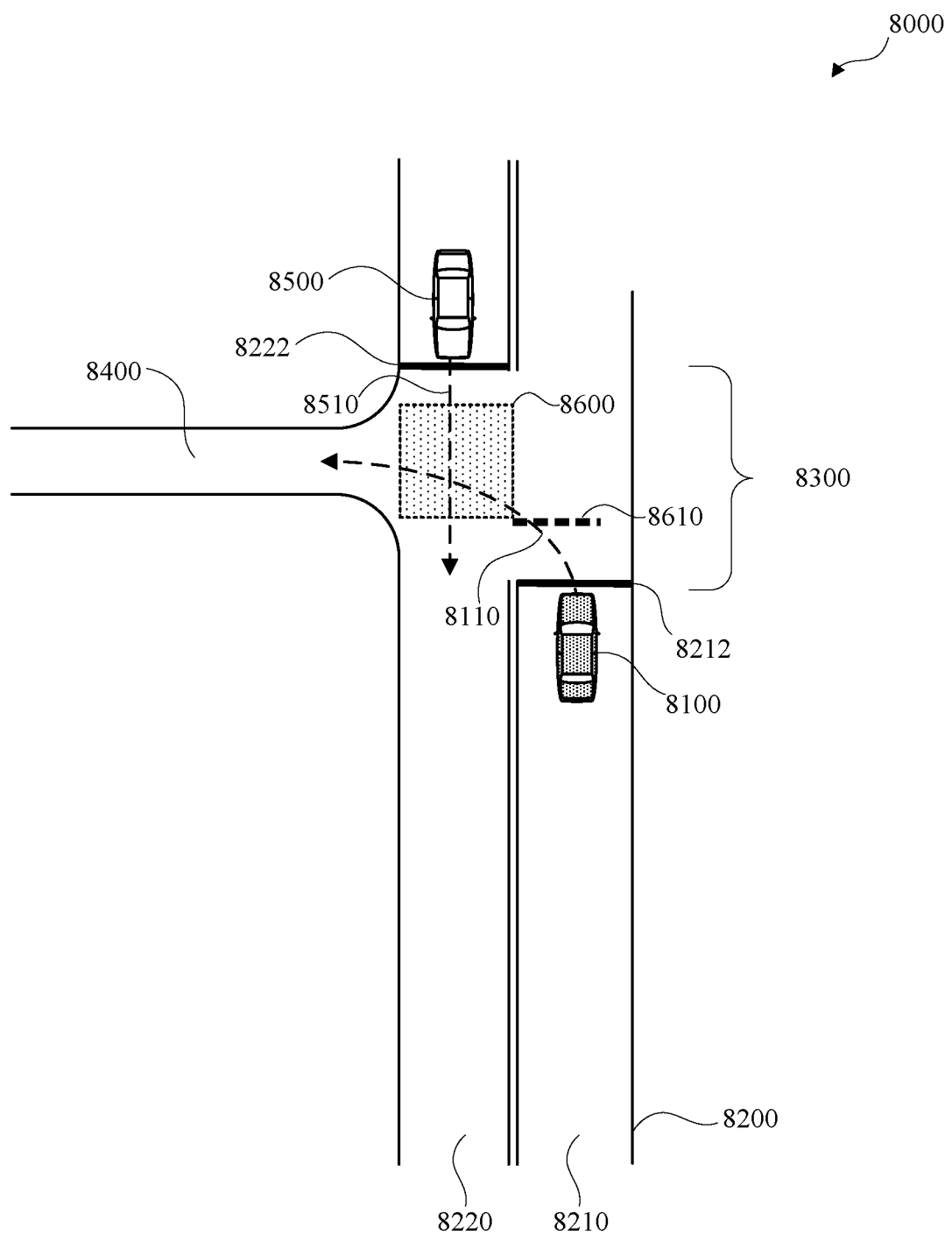
FIG. 8 is a diagram of an example of another intersection scene portion of a vehicle transportation network including an intersection scenario with right-of-way ambiguity in accordance with embodiments of this disclosure.

FIG. 8 is a diagram of an example of another intersection scene 8000 portion of a vehicle transportation network including an intersection scenario with right-of-way ambiguity in accordance with embodiments of this disclosure. Autonomous vehicle operational management may include an autonomous vehicle 8100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 8100 traversing a portion of the vehicle transportation network along a first road 8200 in a first lane 8210 approaching an intersection 8300 with a second road 8400 (intersection scenario). The first lane 8210 may include a first stop line 8212 proximate to the intersection 8300. An expected path 8110 for the autonomous vehicle 8100 is shown using a broken directional line at 8110. For simplicity and clarity, the portion of the vehicle transportation network corresponding to the intersection scene 8000 shown in FIG. 8 is oriented with north at the top and east at the right.

A remote vehicle 8500 is shown traversing a second lane 8220 of the first road 8200 in a direction of travel, southbound, opposite of the autonomous vehicle 8100. The second lane 8220 may include a second stop line 8222 proximate to the intersection 8300. An expected path 8510 for the remote vehicle 8500 is shown using a broken directional line.

The autonomous vehicle operational management system of the autonomous vehicle 8100 may operate an intersection monitor, such as the intersection monitor 4230 shown in FIG. 4, which may include instantiating the intersection monitor, which may be similar to operating an intersection monitor as described in relation to FIG. 6, except as indicated herein or otherwise clear from context. The autonomous vehicle operational management controller may detect or identify the intersection scenario, such as based on the operational environment represented by the operational environment information, which may include the operational environment information output by the intersection monitor. The autonomous vehicle operational management controller may instantiate, or update, one or more intersection-SSOCEM instances and may send, or otherwise make available, the operational environment information to the intersection-SSOCEM instances, in response to detecting or identifying intersection scenario. The intersection-SSOCEM instances may be similar to intersection-SSOCEM instances as described in relation to FIG. 6, except as indicated herein or otherwise clear from context.

Instantiating the intersection-SSOCEM instance may include identifying a solution or policy for a model of the intersection vehicle operational scenario from the intersection-SSOCEM. Identifying the solution or policy for the model of the intersection vehicle operational scenario from the intersection-SSOCEM may include solving the intersection-SSOCEM model. Instantiating the intersection-SSOCEM instance may include instantiating an instance of the solution or policy. The intersection-SSOCEM solution instance may generate a candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated intersection-SSOCEM instances and may identify a vehicle control action based on the received candidate vehicle control actions for controlling the autonomous vehicle 8100 at the corresponding temporal location and may control the autonomous vehicle to traverse the vehicle transportation network, or a portion thereof, in accordance with the identified vehicle control action.

For the intersection scene 8000 shown in FIG. 8, the autonomous vehicle 8100 may approach the intersection 8300. The autonomous vehicle 8100 may identify a portion of the vehicle transportation network as a right-of-way overlap area 8600. Identifying the right-of-way overlap area 8600 may include identifying a right-of-way boundary location 8700. The autonomous vehicle 8100 may stop, or slow to a minimal speed, such as a speed below a defined maximum orientation-adjust speed, at, or proximate to, a defined approach distance from the right-of-way boundary location 8700, which may correspond with the stop line 8212 as shown. The remote vehicle 8500 may approach the intersection 8300 and may stop at the second stop line 8222 substantially concurrently with the autonomous vehicle 8100 arriving at the first stop line 8212.

The scenario-specific operational control evaluation model policy may determine that the uncertainty of a current belief state for the distinct vehicle operational scenario exceeds a defined uncertainty threshold. For example, the autonomous vehicle 8100 may arrive at the first stop line 8212 and, substantially concurrently, the remote vehicle 8500 may arrive at the second stop line 8222, which may increase uncertainty regarding the right-of-way for the right-of-way overlap area 8600. In another example, the remote vehicle 8500 may arrive at the second stop line 8222 prior to the arrival of the autonomous vehicle 8100 at the first stop line 8212, which may indicate that the remote vehicle 8500 has right-of-way, and the remote vehicle 8500 may remain stationary at the second stop line 8222 for defined right-of-way period, such as two seconds, after the arrival of the autonomous vehicle 8100 at the first stop line 8212, which may increase uncertainty regarding the right-of-way for the right-of-way overlap area 8600.

The scenario-specific operational control evaluation model policy may output an orientation-adjust vehicle control action. The autonomous vehicle 8100 may traverse a portion of the vehicle transportation network in accordance with the orientation-adjust vehicle control action. Traversing the portion of the vehicle transportation network in accordance with the orientation-adjust vehicle control action may reduce uncertainty regarding the right-of-way for the right-of-way overlap area 8600.

For example, the uncertainty may be based on uncertainty regarding whether the remote vehicle 8500 (external object) will yield right-of-way (expected operation) to the autonomous vehicle 8100, and traversing the portion of the vehicle transportation network in accordance with the orientation-adjust vehicle control action may reduce uncertainty regarding the right-of-way for the right-of-way overlap area 8600 by increasing the probability that the remote vehicle 8500 will yield right-of-way in response to the remote vehicle 8500 remaining stationary, or decreasing the probability that the remote vehicle 8500 will yield right-of-way in response to the remote vehicle 8500 traversing the intersection 8300.

In another example, the uncertainty may be based on an expected external uncertainty, which may indicate an expected uncertainty of an external object, such as the remote vehicle 8500, regarding an expected subsequent vehicle control action for the autonomous vehicle 8100 relative to the right-of-way for the right-of-way overlap area 8600. Traversing the portion of the vehicle transportation network in accordance with the orientation-adjust vehicle control action may reduce uncertainty regarding the right-of-way for the right-of-way overlap area 8600 by controlling the autonomous vehicle 8100 to output a semiotic representation, such as the orientation-adjust motion of the autonomous vehicle 8100, of an expected subsequent right-of-way and a corresponding expected subsequent vehicle control action for the autonomous vehicle 8100, such as a proceed vehicle control action to traverse the right-of-way overlap area 8600.

Traversing the portion of the vehicle transportation network in accordance with the orientation-adjust vehicle control action may include traversing the vehicle transportation network from a current location of the autonomous vehicle 8100 toward the boundary location 8700 at a speed within, such as at or below, a defined maximum orientation-adjust speed, such as two meters per second.

Traversing the vehicle transportation network in accordance with the orientation-adjust vehicle control action may include determining whether a distance between the current location of the autonomous vehicle 8100 and the right-of-way boundary location 8700 is within, such as equal to or less than, an expected distance-to-stationary. For example, the autonomous vehicle 8100 may determine that the distance between the current location of the autonomous vehicle 8100 and the right-of-way boundary location 8700 is within the expected distance-to-stationary and the autonomous vehicle may traverse the vehicle transportation network by decelerating in accordance with a defined deceleration profiled to stop at, or proximate to, the boundary location 8700. The expected distance-to-stationary may indicate a determined distance for the autonomous vehicle 8100 to transition from an in-motion state to a stationary state. In some implementations, the autonomous vehicle may determine that a current location of the autonomous vehicle corresponds with the right-of-way boundary location, and the autonomous vehicle may traverse the vehicle transportation network by controlling the autonomous vehicle to be stationary (stopping).

Although not shown in FIG. 8, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 8100 may be located more proximate to the second road 8400 than the first stop line 8212, such as proximate to the right-of-way boundary location 8700, and the remote vehicle 8500 may remain stationary at the second stop line 8222, which may reduce or eliminate right-of-way ambiguity, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a stop vehicle control action. For example, the autonomous vehicle may determine that the remote vehicle 8500 is stationary and that the autonomous vehicle has right-of-way, and the scenario-specific operational control evaluation model policy may output a proceed vehicle control action. In another example, the autonomous vehicle may determine that the remote vehicle 8500 has right-of-way, or is otherwise proceeding through the intersection, and that the autonomous vehicle does not currently have right-of-way, and the scenario-specific operational control evaluation model policy may output a stop vehicle control action.

Figure 9:
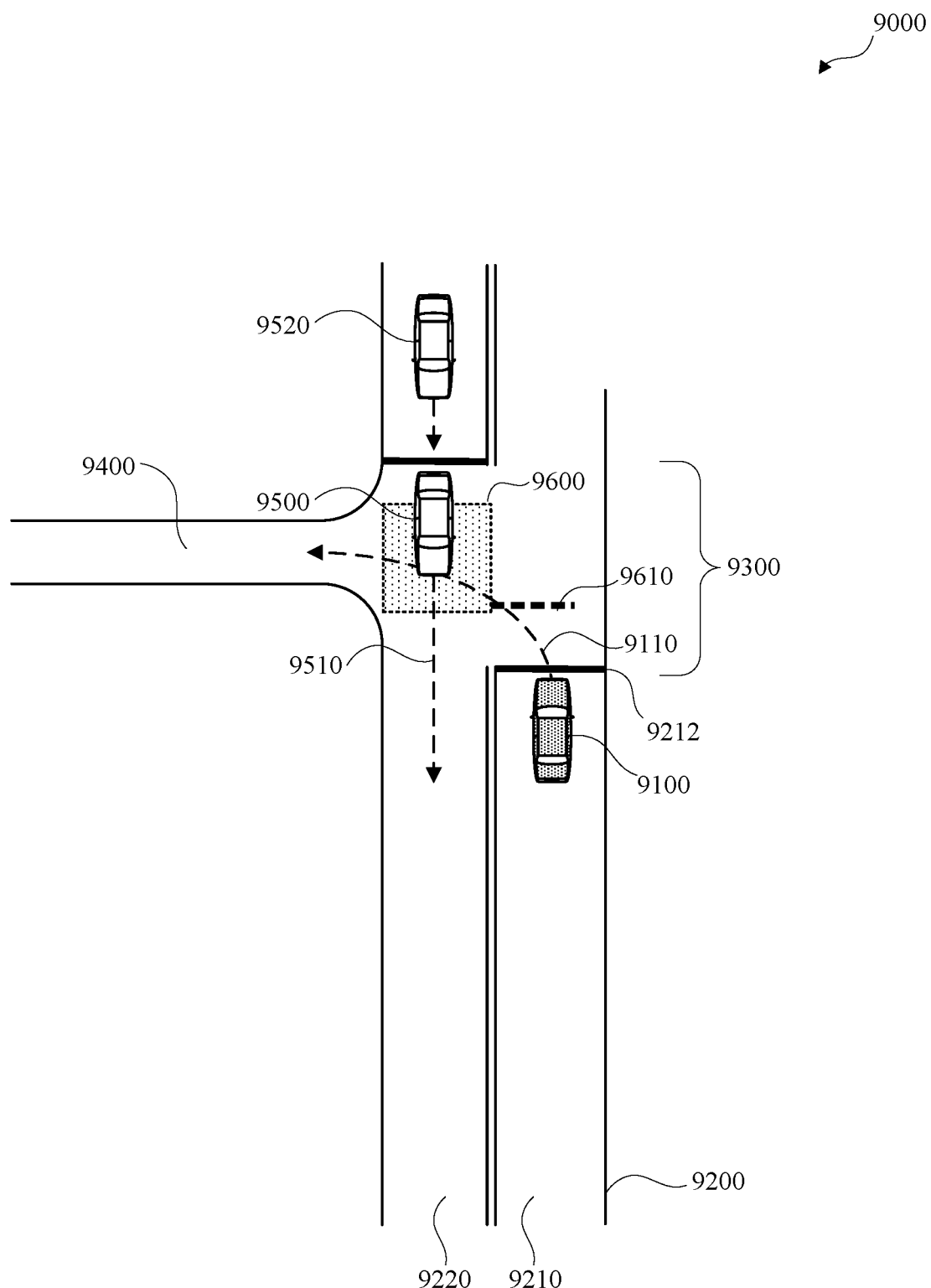
FIG. 9 is a diagram of an example of another intersection scene portion of a vehicle transportation network including an intersection scenario with right-of-way ambiguity in accordance with embodiments of this disclosure.

FIG. 9 is a diagram of an example of another intersection scene 9000 portion of a vehicle transportation network including an intersection scenario with right-of-way ambiguity in accordance with embodiments of this disclosure. Autonomous vehicle operational management may include an autonomous vehicle 9100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 9100 traversing a portion of the vehicle transportation network along a first road 9200 in a first lane 9210 approaching an intersection 9300 with a second road 9400 (intersection scenario). The first lane 9210 may include a stop line 9212 proximate to the intersection 9300. For simplicity and clarity, the portion of the vehicle transportation network corresponding to the intersection scene 9000 shown in FIG. 9 is oriented with north at the top and east at the right.

A first remote vehicle 9500 is shown traversing the intersection 9300 in a second lane 9220 of the first road 9200 in a direction of travel, southbound, opposite of the autonomous vehicle 9100. An expected path 9510 for the first remote vehicle 9500 is shown using a broken directional line. A second remote vehicle 9520 is shown approaching the intersection 9300 in the second lane 9220.

The autonomous vehicle operational management system of the autonomous vehicle 9100 may operate an intersection monitor, such as the intersection monitor 4230 shown in FIG. 4, which may include instantiating the intersection monitor, which may be similar to operating an intersection monitor as described in relation to FIG. 6, except as indicated herein or otherwise clear from context. The autonomous vehicle operational management controller may detect or identify the intersection scenario, such as based on the operational environment represented by the operational environment information, which may include the operational environment information output by the intersection monitor. The autonomous vehicle operational management controller may instantiate, or update, one or more intersection-SSOCEM instances and may send, or otherwise make available, the operational environment information to the intersection-SSOCEM instances, in response to detecting or identifying intersection scenario. The intersection-SSOCEM instances may be similar to intersection-SSOCEM instances as described in relation to FIG. 6, except as indicated herein or otherwise clear from context.

Instantiating the intersection-SSOCEM instance may include identifying a solution or policy for a model of the intersection vehicle operational scenario from the intersection-SSOCEM. Identifying the solution or policy for the model of the intersection vehicle operational scenario from the intersection-SSOCEM may include solving the intersection-SSOCEM model. Instantiating the intersection-SSOCEM instance may include instantiating an instance of the solution or policy. The intersection-SSOCEM solution instance may generate a candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated intersection-SSOCEM instances and may identify a vehicle control action based on the received candidate vehicle control actions for controlling the autonomous vehicle 9100 at the corresponding temporal location and may control the autonomous vehicle to traverse the vehicle transportation network, or a portion thereof, in accordance with the identified vehicle control action.

For the intersection scene 9000 shown in FIG. 9, the autonomous vehicle 9100 may approach the intersection 9300. The autonomous vehicle 9100 may identify a portion of the vehicle transportation network as a right-of-way overlap area 9600. Identifying the right-of-way overlap area 9600 may include identifying a right-of-way boundary location 9610. The autonomous vehicle 9100 may stop, or slow to a minimal speed, such as a speed below a defined maximum orientation-adjust speed, at, or proximate to, a defined approach distance from the right-of-way boundary location 9610, which may correspond with the stop line 9212 as shown. The first remote vehicle 9500 may be traversing the intersection 9300 substantially concurrently with the autonomous vehicle 9100 arriving at the first stop line 9212.

The scenario-specific operational control evaluation model policy may determine that the uncertainty of a current belief state for the distinct vehicle operational scenario exceeds a defined uncertainty threshold. For example, the autonomous vehicle 9100 may arrive at the first stop line 9212 and, substantially concurrently, the first remote vehicle 9500 may be traversing the right-of-way overlap area 9600, which may increase uncertainty regarding the right-of-way for the right-of-way overlap area 9600 in accordance with uncertainty regarding the first remote vehicle 9500 exiting the right-of-way overlap area 9600. In another example, the second remote vehicle 9520 may approach the intersection 9300 in the second lane 9220 substantially concurrently with the first remote vehicle 9500 traversing the right-of-way overlap area 9600, which may increase uncertainty regarding the right-of-way for the right-of-way overlap area 9600.

The scenario-specific operational control evaluation model policy may output an orientation-adjust vehicle control action. The autonomous vehicle 9100 may traverse a portion of the vehicle transportation network in accordance with the orientation-adjust vehicle control action. Traversing the portion of the vehicle transportation network in accordance with the orientation-adjust vehicle control action may reduce uncertainty regarding the right-of-way for the right-of-way overlap area 9600.

For example, the uncertainty may be based on uncertainty regarding whether, when, or both, the first remote vehicle 9500 (external object) will exit (expected operation) the intersection 9300, and traversing the portion of the vehicle transportation network in accordance with the orientation-adjust vehicle control action may reduce uncertainty regarding the right-of-way for the right-of-way overlap area 9600 by increasing the probability that the remote vehicle 9500 will exit the intersection 9300.

In another example, the uncertainty may be based on uncertainty regarding whether the second remote vehicle 9520 (external object) will yield right-of-way (expected operation) to the autonomous vehicle 9100, and traversing the portion of the vehicle transportation network in accordance with the orientation-adjust vehicle control action may reduce uncertainty regarding the right-of-way for the right-of-way overlap area 9600 by increasing the probability that the second remote vehicle 9520 will yield right-of-way.

In another example, the uncertainty may be based on an expected external uncertainty, which may indicate an expected uncertainty of an external object, such as the second remote vehicle 9520, regarding an expected subsequent vehicle control action for the autonomous vehicle 9100 relative to the right-of-way for the right-of-way overlap area 9600. Traversing the portion of the vehicle transportation network in accordance with the orientation-adjust vehicle control action may reduce uncertainty regarding the right-of-way for the right-of-way overlap area 9600 by controlling the autonomous vehicle 9100 to output a semiotic representation, such as the orientation-adjust motion of the autonomous vehicle 9100, of an expected subsequent right-of-way and a corresponding expected subsequent vehicle control action for the autonomous vehicle 9100, such as a proceed vehicle control action to traverse the right-of-way overlap area 9600.

Traversing the portion of the vehicle transportation network in accordance with the orientation-adjust vehicle control action may include traversing the vehicle transportation network from a current location of the autonomous vehicle 9100 toward the boundary location 9610 at a speed within, such as at or below, a defined maximum orientation-adjust speed, such as two meters per second.

Traversing the vehicle transportation network in accordance with the orientation-adjust vehicle control action may include determining whether a distance between the current location of the autonomous vehicle 9100 and the right-of-way boundary location 9610 is within, such as equal to or less than, an expected distance-to-stationary. For example, the autonomous vehicle 9100 may determine that the distance between the current location of the autonomous vehicle 9100 and the right-of-way boundary location 9610 is within the expected distance-to-stationary and the autonomous vehicle may traverse the vehicle transportation network by decelerating in accordance with a defined deceleration profiled to stop at, or proximate to, the boundary location 9610. The expected distance-to-stationary may indicate a determined distance for the autonomous vehicle 9100 to transition from an in-motion state to a stationary state. In some implementations, the autonomous vehicle may determine that a current location of the autonomous vehicle corresponds with the right-of-way boundary location, and the autonomous vehicle may traverse the vehicle transportation network by controlling the autonomous vehicle to be stationary (stopping).

Although not shown in FIG. 9, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 9100 may be located more proximate to the second road 9400 than the stop line 9212, such as proximate to the right-of-way boundary location 9610, and the first remote vehicle 9500 may remain stationary at the second stop line 9222, which may reduce or eliminate right-of-way ambiguity, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a stop vehicle control action. For example, the autonomous vehicle may determine that the remote vehicle 9700 is stationary and that the autonomous vehicle has right-of-way, and the scenario-specific operational control evaluation model policy may output a proceed vehicle control action. In another example, the autonomous vehicle may determine that the remote vehicle 9700 has right-of-way, or is otherwise proceeding through the intersection, and that the autonomous vehicle does not currently have right-of-way, and the scenario-specific operational control evaluation model policy may output a stop vehicle control action.

Figure 10:
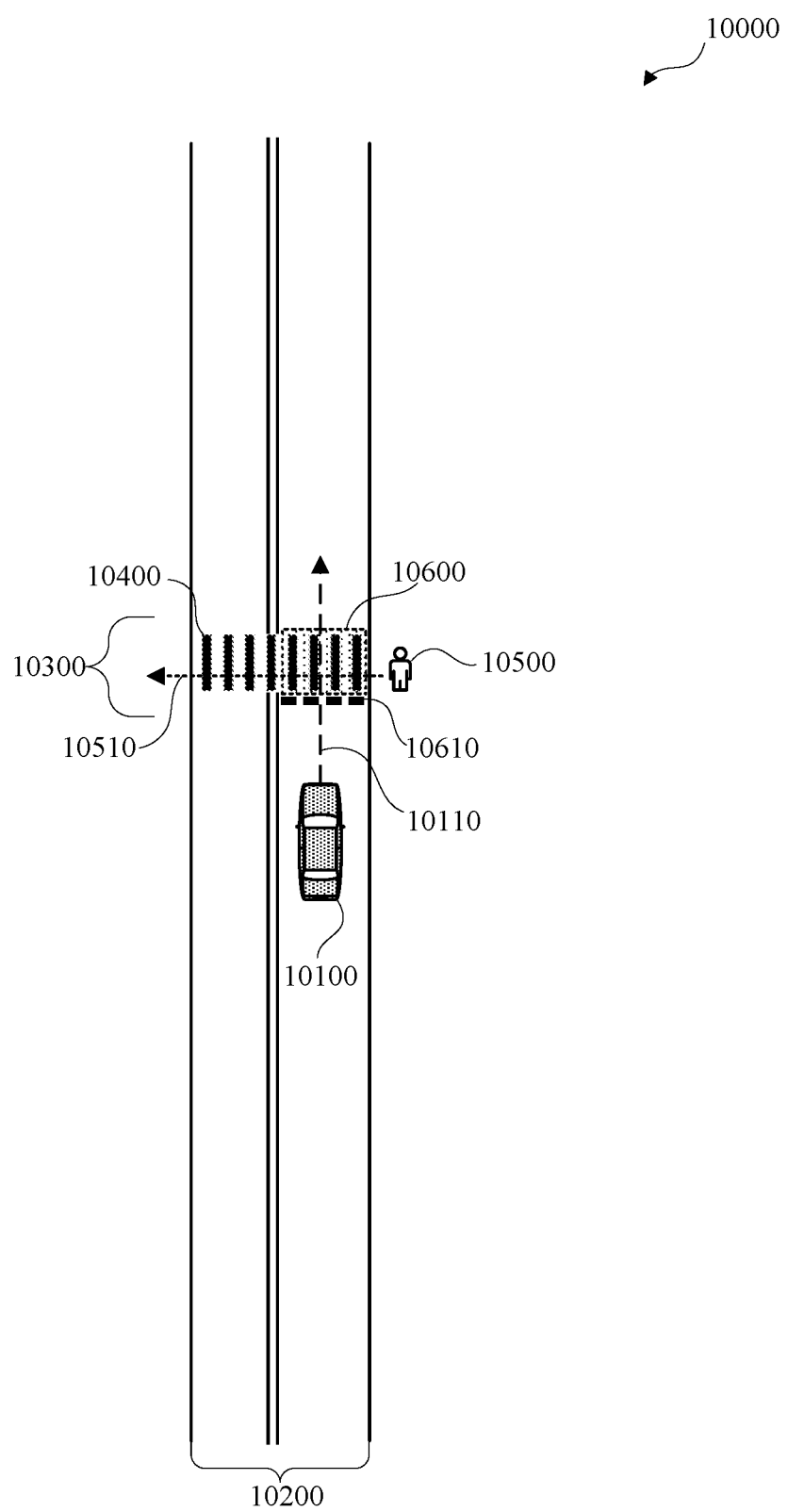
FIG. 10 is a diagram of an example of a pedestrian scene portion of a vehicle transportation network including a pedestrian scenario with right-of-way ambiguity in accordance with embodiments of this disclosure.

FIG. 10 is a diagram of an example of a pedestrian scene 10000 portion of a vehicle transportation network including a pedestrian scenario with right-of-way ambiguity in accordance with embodiments of this disclosure. Autonomous vehicle operational management may include an autonomous vehicle 10100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 10100 traversing a portion of the vehicle transportation network along a first road 10200 approaching an intersection 10300 with an overlapping portion of a pedestrian transportation network 10400. An expected path 10110 for the autonomous vehicle 10100 is shown using a broken directional line at 10110. For simplicity and clarity, the portion of the vehicle transportation network corresponding to the yield-stop scene 10000 shown in FIG. 10 is oriented with north at the top and east at the right.

A pedestrian 10500 is shown proximate to the intersection 10300. An expected path 10510 for the pedestrian 10500 is shown using a broken directional, indicating that the pedestrian 10500 may affect the operation of the autonomous vehicle 10100. Although the pedestrian 10500 is shown in FIG. 10 as traversing an overlapping portion of a pedestrian transportation network 10400 (crosswalk), the pedestrian scene 10000 may omit the overlapping portion of a pedestrian transportation network 10400 or the pedestrian 10500 may otherwise traverse a portion of the vehicle transportation network (jaywalking).

The autonomous vehicle operational management system of the autonomous vehicle 10100 may operate a pedestrian monitor, such as the pedestrian monitor 4220 shown in FIG. 4, which may include instantiating the pedestrian monitor, and which may be similar to operating an intersection monitor as described in relation to FIG. 6, except as indicated herein or otherwise clear from context. The autonomous vehicle operational management controller may detect or identify the pedestrian (yield-stop) scenario, such as based on the operational environment represented by the operational environment information, which may include the operational environment information output by the intersection monitor. The autonomous vehicle operational management controller may instantiate, or update, one or more pedestrian-SSOCEM instances and may send, or otherwise make available, the operational environment information to the pedestrian-SSOCEM instances, in response to detecting or identifying pedestrian scenario. The pedestrian-SSOCEM instances may be similar to intersection-SSOCEM instances as described in relation to FIG. 6, except as indicated herein or otherwise clear from context.

Instantiating the pedestrian-SSOCEM instance may include identifying a solution or policy for a model of the pedestrian vehicle operational scenario from the pedestrian-SSOCEM. Identifying the solution or policy for the model of the pedestrian vehicle operational scenario from the pedestrian-SSOCEM may include solving the pedestrian-SSOCEM model. Instantiating the pedestrian-SSOCEM instance may include instantiating an instance of the solution or policy. The pedestrian-SSOCEM solution instance may generate a candidate vehicle control action, such as 'stop', 'yield-stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated pedestrian-SSOCEM instances and may identify a vehicle control action based on the received candidate vehicle control actions for controlling the autonomous vehicle 10100 at the corresponding temporal location and may control the autonomous vehicle to traverse the vehicle transportation network, or a portion thereof, in accordance with the identified vehicle control action.

For the pedestrian scene 10000 shown in FIG. 10, the autonomous vehicle 10100 may approach the intersection 10300 with the overlapping portion of a pedestrian transportation network 10400. The autonomous vehicle 10100 may identify a portion of the vehicle transportation network as a right-of-way overlap area 10600. For example, the right-of-way overlap area 10600 may be identified based on vehicle transportation network information indicating the overlapping portion of a pedestrian transportation network 10400, sensor information indicating the overlapping portion of a pedestrian transportation network 10400, sensor information identifying the expected path 10510 of the pedestrian 10500, or a combination thereof. Identifying the right-of-way overlap area 10600 may include identifying a right-of-way boundary location 10610.

The autonomous vehicle 10100 may stop, or slow to a minimal speed, such as a speed below a defined maximum orientation-adjust speed, at, or proximate to, a defined approach distance from the right-of-way boundary location 10610. Although a stop line is not shown in FIG. 10, the vehicle transportation network may include a stop line, which may correspond with defined approach distance from the right-of-way boundary location 10610.

The scenario-specific operational control evaluation model policy may determine that the uncertainty of a current belief state for the distinct vehicle operational scenario exceeds a defined uncertainty threshold. For example, the autonomous vehicle 10100 may arrive at the defined approach distance from the right-of-way boundary location 10610 and, substantially concurrently, the pedestrian 10500 may be stationary or in motion along the expected path 10510 for the pedestrian 10500 proximate to the road 10200, which may increase uncertainty regarding the right-of-way for the right-of-way overlap area 10600.

The scenario-specific operational control evaluation model policy may output an orientation-adjust vehicle control action. The autonomous vehicle 10100 may traverse a portion of the vehicle transportation network in accordance with the orientation-adjust vehicle control action. Traversing the portion of the vehicle transportation network in accordance with the orientation-adjust vehicle control action may reduce uncertainty regarding the right-of-way for the right-of-way overlap area 10600.

For example, the uncertainty may be based on uncertainty regarding whether the pedestrian 10500 (external object) will yield right-of-way (expected operation) to the autonomous vehicle 10100, and traversing the portion of the vehicle transportation network in accordance with the orientation-adjust vehicle control action may reduce uncertainty regarding the right-of-way for the right-of-way overlap area 10600 by increasing the probability that the pedestrian 10500 will yield right-of-way in response to the pedestrian 10500 remaining stationary, or decreasing the probability that the pedestrian 10500 will yield right-of-way in response to the pedestrian 10500 traversing the intersection 10300.

In another example, the uncertainty may be based on an expected external uncertainty, which may indicate an expected uncertainty of an external object, such as the pedestrian 10500, regarding an expected subsequent vehicle control action for the autonomous vehicle 10100 relative to the right-of-way for the right-of-way overlap area 10600. Traversing the portion of the vehicle transportation network in accordance with the orientation-adjust vehicle control action may reduce uncertainty regarding the right-of-way for the right-of-way overlap area 10600 by controlling the autonomous vehicle 10100 to output a semiotic representation, such as the orientation-adjust motion of the autonomous vehicle 10100, of an expected subsequent right-of-way and a corresponding expected subsequent vehicle control action for the autonomous vehicle 10100, such as a proceed vehicle control action to traverse the right-of-way overlap area 10600.

Traversing the portion of the vehicle transportation network in accordance with the orientation-adjust vehicle control action may include traversing the vehicle transportation network from a current location of the autonomous vehicle 10100 toward the boundary location 10610 at a speed within, such as at or below, a defined maximum orientation-adjust speed, such as two meters per second. Traversing the vehicle transportation network in accordance with the orientation-adjust vehicle control action may include determining whether a distance between the current location of the autonomous vehicle 10100 and the right-of-way boundary location 10610 is within, such as equal to or less than, an expected distance-to-stationary. For example, the autonomous vehicle 10100 may determine that the distance between the current location of the autonomous vehicle 10100 and the right-of-way boundary location 10610 is within the expected distance-to-stationary and the autonomous vehicle may traverse the vehicle transportation network by decelerating in accordance with a defined deceleration profiled to stop at, or proximate to, the boundary location 10610. The expected distance-to-stationary may indicate a determined distance for the autonomous vehicle 10100 to transition from an in-motion state to a stationary state. In some implementations, the autonomous vehicle may determine that a current location of the autonomous vehicle corresponds with the right-of-way boundary location, and the autonomous vehicle may traverse the vehicle transportation network by controlling the autonomous vehicle to be stationary (stopping).

Although not shown in FIG. 10, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 10100 may be located more proximate to the expected path 10510 for the pedestrian 10500 than the defined approach distance from the right-of-way boundary location 10610, such as proximate to the right-of-way boundary location 10610, and the pedestrian 10500 may remain stationary proximate to the vehicle transportation network as shown, or may have traversed the overlapping portion of a pedestrian transportation network 10400, which may reduce or eliminate right-of-way ambiguity, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a stop vehicle control action. For example, the autonomous vehicle may determine that the pedestrian 10500 is stationary proximate to the vehicle transportation network as shown or has traversed the overlapping portion of a pedestrian transportation network 10400, and that the autonomous vehicle has right-of-way, and the scenario-specific operational control evaluation model policy may output a proceed vehicle control action. In another example, the autonomous vehicle may determine that the pedestrian 10500 has right-of-way, or is otherwise proceeding through the overlapping portion of a pedestrian transportation network 10400, and that the autonomous vehicle does not currently have right-of-way, and the scenario-specific operational control evaluation model policy may output a stop vehicle control action.

Figure 11:
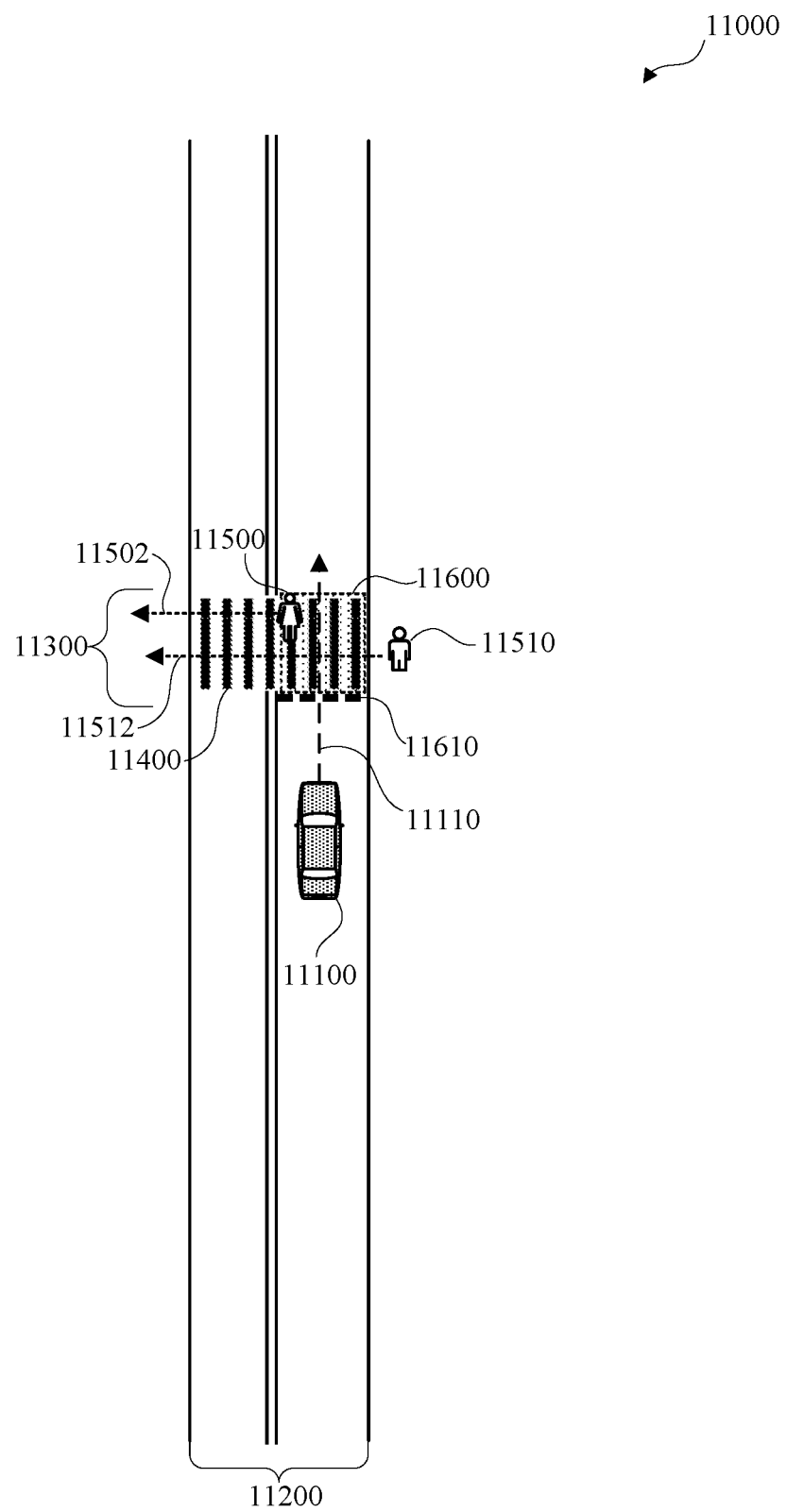
FIG. 11 is a diagram of an example of another pedestrian scene portion of a vehicle transportation network including a yield-stop pedestrian scenario with right-of-way ambiguity in accordance with embodiments of this disclosure.

FIG. 11 is a diagram of an example of another pedestrian scene 11000 portion of a vehicle transportation network including a yield-stop pedestrian scenario with right-of-way ambiguity in accordance with embodiments of this disclosure. Autonomous vehicle operational management may include an autonomous vehicle 11100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 11100 traversing a portion of the vehicle transportation network along a first road 11200 approaching an intersection 11300 with an overlapping portion of a pedestrian transportation network 11400 (crosswalk). An expected path 11110 for the autonomous vehicle 11100 is shown using a broken directional line at 11110. For simplicity and clarity, the portion of the vehicle transportation network corresponding to the yield-stop scene 11000 shown in FIG. 11 is oriented with north at the top and east at the right.

A first pedestrian 11500 is shown traversing the overlapping portion of the pedestrian transportation network 11400. An expected path 11502 for the first pedestrian 11500 is shown using a broken directional line, indicating that the first pedestrian 11500 may affect the operation of the autonomous vehicle 11100. A second pedestrian 11510 is shown proximate to the overlapping portion of the pedestrian transportation network 11400. An expected path 11512 for the second pedestrian 11510 is shown using a broken directional, indicating that the second pedestrian 11510 may affect the operation of the autonomous vehicle 11100. Although the pedestrians 11500, 11510 are shown in FIG. 11 in relation to the overlapping portion of the pedestrian transportation network 11400, the pedestrian scene 11000 may omit the overlapping portion of the pedestrian transportation network 11400 or the pedestrians 11500, 11510 may otherwise traverse a portion of the vehicle transportation network (jaywalking).

The autonomous vehicle operational management system of the autonomous vehicle 11100 may operate a pedestrian monitor, such as the pedestrian monitor 4220 shown in FIG. 4, which may include instantiating the pedestrian monitor, and which may be similar to operating an intersection monitor as described in relation to FIG. 6, except as indicated herein or otherwise clear from context. The autonomous vehicle operational management controller may detect or identify the pedestrian scenario, such as based on the operational environment represented by the operational environment information, which may include the operational environment information output by the intersection monitor. The autonomous vehicle operational management controller may instantiate, or update, one or more pedestrian-SSOCEM instances and may send, or otherwise make available, the operational environment information to the pedestrian-SSOCEM instances, in response to detecting or identifying pedestrian scenario. The pedestrian-SSOCEM instances may be similar to intersection-SSOCEM instances as described in relation to FIG. 6, except as indicated herein or otherwise clear from context.

Instantiating the pedestrian-SSOCEM instance may include identifying a solution or policy for a model of the pedestrian vehicle operational scenario from the pedestrian-SSOCEM. Identifying the solution or policy for the model of the pedestrian vehicle operational scenario from the pedestrian-SSOCEM may include solving the pedestrian-SSOCEM model. Instantiating the pedestrian-SSOCEM instance may include instantiating an instance of the solution or policy. The pedestrian-SSOCEM solution instance may generate a candidate vehicle control action, such as 'stop', 'yield-stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated pedestrian-SSOCEM instances and may identify a vehicle control action based on the received candidate vehicle control actions for controlling the autonomous vehicle 11100 at the corresponding temporal location and may control the autonomous vehicle to traverse the vehicle transportation network, or a portion thereof, in accordance with the identified vehicle control action.

For the pedestrian scene 11000 shown in FIG. 11, the autonomous vehicle 11100 may approach the overlapping portion of the pedestrian transportation network 11400. The autonomous vehicle 11100 may identify a portion of the vehicle transportation network as a right-of-way overlap area 11600. Identifying the right-of-way overlap area 11600 may include identifying a right-of-way boundary location 11610. Identifying the right-of-way overlap area 11600 may be based on vehicle transportation network information, pedestrian transportation network information, sensor data indicating the pedestrians 11500, 11510, or a combination thereof.

The autonomous vehicle 11100 may stop, or slow to a minimal speed, such as a speed below a defined maximum orientation-adjust speed, at, or proximate to, a defined approach distance from the right-of-way boundary location 11610. Although a stop line is not shown in FIG. 11, the vehicle transportation network may include a stop line, which may correspond with defined approach distance from the right-of-way boundary location 11610.

The scenario-specific operational control evaluation model policy may determine that the uncertainty of a current belief state for the distinct vehicle operational scenario exceeds a defined uncertainty threshold. For example, the autonomous vehicle 11100 may arrive at the defined approach distance from the right-of-way boundary location 11610 and, substantially concurrently, the first pedestrian 11500 may be stationary or in motion along the expected path 11502 for the first pedestrian 11500 traversing the overlapping portion of the pedestrian transportation network 11400, and the second pedestrian 11510 may be stationary or in motion proximate to the road 11200, which may increase uncertainty regarding the right-of-way for the right-of-way overlap area 11600.

The scenario-specific operational control evaluation model policy may output an orientation-adjust vehicle control action. The autonomous vehicle 11100 may traverse a portion of the vehicle transportation network in accordance with the orientation-adjust vehicle control action. Traversing the portion of the vehicle transportation network in accordance with the orientation-adjust vehicle control action may reduce uncertainty regarding the right-of-way for the right-of-way overlap area 11600.

For example, the uncertainty may be based on uncertainty regarding whether, when, or both, the first pedestrian 11500 (external object) will exit (expected operation) the overlapping portion of the pedestrian transportation network 11400, and traversing the portion of the vehicle transportation network in accordance with the orientation-adjust vehicle control action may reduce uncertainty regarding the right-of-way for the right-of-way overlap area 11600 by increasing the probability that the first pedestrian 11500 will exit the overlapping portion of the pedestrian transportation network 11400.

In another example, the uncertainty may be based on uncertainty regarding whether the second pedestrian 11510 (external object) will yield right-of-way (expected operation) to the autonomous vehicle 11100, and traversing the portion of the vehicle transportation network in accordance with the orientation-adjust vehicle control action may reduce uncertainty regarding the right-of-way for the right-of-way overlap area 11600 by increasing the probability that the second pedestrian 11510 will yield right-of-way in response to the second pedestrian 11510 remaining stationary, or decreasing the probability that the second pedestrian 11510 will yield right-of-way in response to the second pedestrian 11510 traversing the overlapping portion of the pedestrian transportation network 11400.

In another example, the uncertainty may be based on an expected external uncertainty, which may indicate an expected uncertainty of an external object, such as the second pedestrian 11510, regarding an expected subsequent vehicle control action for the autonomous vehicle 11100 relative to the right-of-way for the right-of-way overlap area 11600. Traversing the portion of the vehicle transportation network in accordance with the orientation-adjust vehicle control action may reduce uncertainty regarding the right-of-way for the right-of-way overlap area 11600 by controlling the autonomous vehicle 11100 to output a semiotic representation, such as the orientation-adjust motion of the autonomous vehicle 11100, of an expected subsequent right-of-way and a corresponding expected subsequent vehicle control action for the autonomous vehicle 11100, such as a proceed vehicle control action to traverse the right-of-way overlap area 11600.

Traversing the portion of the vehicle transportation network in accordance with the orientation-adjust vehicle control action may include traversing the vehicle transportation network from a current location of the autonomous vehicle 11100 toward the boundary location 10610 at a speed within, such as at or below, a defined maximum orientation-adjust speed, such as two meters per second. Traversing the vehicle transportation network in accordance with the orientation-adjust vehicle control action may include determining whether a distance between the current location of the autonomous vehicle 11100 and the right-of-way boundary location 10610 is within, such as equal to or less than, an expected distance-to-stationary. For example, the autonomous vehicle 11100 may determine that the distance between the current location of the autonomous vehicle 11100 and the right-of-way boundary location 10610 is within the expected distance-to-stationary and the autonomous vehicle may traverse the vehicle transportation network by decelerating in accordance with a defined deceleration profiled to stop at, or proximate to, the boundary location 10610. The expected distance-to-stationary may indicate a determined distance for the autonomous vehicle 11100 to transition from an in-motion state to a stationary state. In some implementations, the autonomous vehicle may determine that a current location of the autonomous vehicle corresponds with the right-of-way boundary location, and the autonomous vehicle may traverse the vehicle transportation network by controlling the autonomous vehicle to be stationary (stopping).

Although not shown in FIG. 11, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 11100 may be located more proximate the overlapping portion of the pedestrian transportation network 11400 than the defined approach distance from the right-of-way boundary location 10610, such as proximate to the right-of-way boundary location 10610, the first pedestrian 11500 may have traversed the overlapping portion of a pedestrian transportation network, and the second pedestrian 11510 may remain stationary proximate to the vehicle transportation network as shown, which may reduce or eliminate right-of-way ambiguity, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a stop vehicle control action. For example, the autonomous vehicle may determine that the first pedestrian 11500 has traversed the overlapping portion of a pedestrian transportation network, and the second pedestrian 11510 has remained stationary proximate to the vehicle transportation network as shown, and that the autonomous vehicle has right-of-way, and the scenario-specific operational control evaluation model policy may output a proceed vehicle control action. In another example, the autonomous vehicle may determine that the first pedestrian 11500 has right-of-way, or is otherwise traversing the overlapping portion of a pedestrian transportation network or that the second pedestrian 11510 is traversing the overlapping portion of a pedestrian transportation network, and that the autonomous vehicle does not currently have right-of-way, and the scenario-specific operational control evaluation model policy may output a stop vehicle control action.

Figure 12:
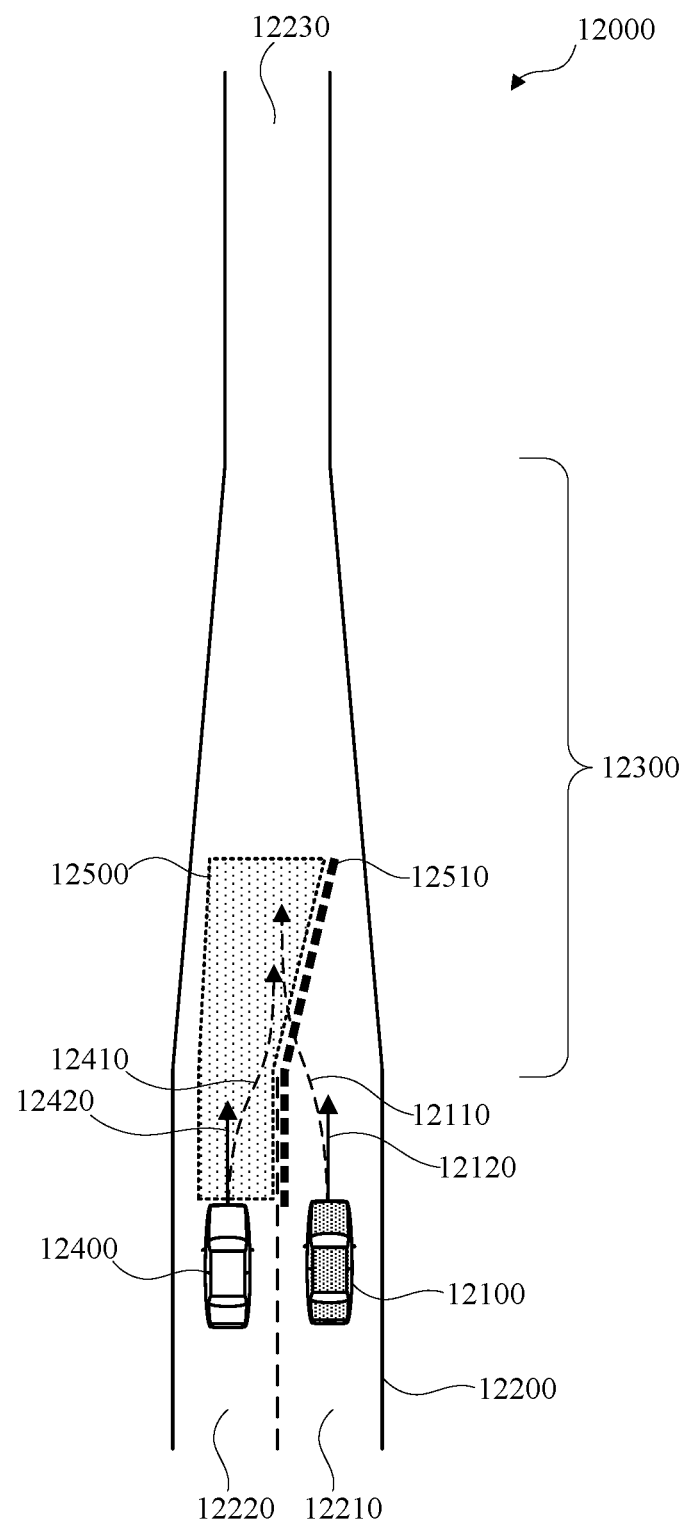
FIG. 12 is a diagram of an example of a merge scene portion of a vehicle transportation network including a merge scenario with right-of-way ambiguity in accordance with embodiments of this disclosure.

FIG. 12 is a diagram of an example of a merge scene 12000 portion of a vehicle transportation network including a merge scenario with right-of-way ambiguity in accordance with embodiments of this disclosure. Autonomous vehicle operational management may include an autonomous vehicle 12100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 12100 traversing a portion of the vehicle transportation network along a first road 12200 in a first lane 12210 approaching a merge-intersection 12300 (merge scenario). An expected path 12110 for the autonomous vehicle 12100 is shown using a broken directional line and a current trajectory for the autonomous vehicle 12100 is shown using a solid directional line 12120. For simplicity and clarity, the portion of the vehicle transportation network corresponding to the merge scene 12000 shown in FIG. 12 is oriented with north at the top and east at the right.

The portion of the vehicle transportation network corresponding to the merge scene 12000 shown in FIG. 12 includes the autonomous vehicle 12100 traversing northward along a road segment in the first lane 12210 of the first road 12200, adjacent to a second lane 12220 of the first road 12200, approaching the merge-intersection 12300. The first lane 12210 and the second lane 12220 merge at the merge-intersection 12300 (lane reduction transition) to form a subsequent merged lane 12230 of the first road 12200. Although the first lane 12210, the second lane 12220, and the merge lane 12230 are shown separately, respective portions of the first lane 12210, the second lane 12220, and the merge lane 12230 may overlap in the merge-intersection 12300. Other merge configurations may be used.

A remote vehicle 12400 is traversing the second lane 12220, approaching the merge-intersection 12300 substantially concurrently with the autonomous vehicle 12100, as shown, or may otherwise approach the merge-intersection 12300 at a spatiotemporal location that is proximate to the spatiotemporal location of the autonomous vehicle 12100 such that the remote vehicle may affect the operation of the autonomous vehicle 12100 traversing the merge scenario, such as by blocking the autonomous vehicle 12100. An expected path 12410 for the remote vehicle 12400 is shown using a broken directional line and a current trajectory 12420 for the remote vehicle 12100 is shown using a solid directional line 12120.

The autonomous vehicle operational management system of the autonomous vehicle 12100 may operate a merge monitor, such as the merge monitor 4250 shown in FIG. 4, which may include instantiating the merge monitor, which may be similar to operating an intersection monitor as described in relation to FIG. 6, except as indicated herein or otherwise clear from context. The autonomous vehicle operational management controller may detect or identify the merge scenario, such as based on the operational environment represented by the operational environment information, which may include the operational environment information output by the merge monitor. The autonomous vehicle operational management controller may instantiate, or update, one or more merge-SSOCEM instances and may send, or otherwise make available, the operational environment information to the merge-SSOCEM instances, in response to detecting or identifying merge scenario including the remote vehicle 12400. The merge-SSOCEM instances may be similar to intersection-SSOCEM instances as described in relation to FIG. 6, except as indicated herein or otherwise clear from context.

Instantiating the merge-SSOCEM instance may include identifying a solution or policy for a model of the merge vehicle operational scenario from the merge-SSOCEM. Identifying the solution or policy for the model of the merge vehicle operational scenario from the merge-SSOCEM may include solving the merge-SSOCEM model. Instantiating the merge-SSOCEM instance may include instantiating an instance of the solution or policy. The merge-SSOCEM solution instance may generate a candidate vehicle control action, such as 'stop', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated merge-SSOCEM instances and may identify a vehicle control action based on the received candidate vehicle control actions for controlling the autonomous vehicle 12100 at the corresponding temporal location and may control the autonomous vehicle to traverse the vehicle transportation network, or a portion thereof, in accordance with the identified vehicle control action.

For the merge scene 12000 shown in FIG. 12, the autonomous vehicle 12100 may approach the merge 12300, such as at a speed in accordance with a defined speed limit, or in accordance with a prevailing traffic speed.

The autonomous vehicle 12100 may identify a portion of the vehicle transportation network as a right-of-way overlap area 12500. Identifying the right-of-way overlap area 12500 may include identifying a right-of-way boundary location 12510, which may be a location in the vehicle transportation network along the expected path 12110 of the autonomous vehicle 12100 between a current location of the autonomous vehicle 12100 and the right-of-way overlap area 12500 proximate to, such as immediately adjacent to, the right-of-way overlap area 12500 which may be the closest location in the vehicle transportation network along the expected path 12110 for the autonomous vehicle 12100 to the right-of-way overlap area 12500 that the autonomous vehicle 12100 may safely traverse without entering the right-of-way overlap area 12500.

The scenario-specific operational control evaluation model policy may determine that the uncertainty of a current belief state for the distinct vehicle operational scenario exceeds a defined uncertainty threshold. For example, the autonomous vehicle 12100 and the remote vehicle 12400 may approach the merge intersection 12300 substantially concurrently, which may increase uncertainty regarding the right-of-way for the right-of-way overlap area 12500.

The scenario-specific operational control evaluation model policy may output an orientation-adjust vehicle control action. The autonomous vehicle 12100 may traverse a portion of the vehicle transportation network in accordance with the orientation-adjust vehicle control action, which may include traversing the vehicle transportation network from a current location of the autonomous vehicle 12100 toward subsequent merged lane 12230. Traversing the portion of the vehicle transportation network in accordance with the orientation-adjust vehicle control action may reduce uncertainty regarding the right-of-way for the right-of-way overlap area 12500.

For example, the uncertainty may be based on uncertainty regarding whether the remote vehicle 12400 (external object) will yield right-of-way (expected operation) to the autonomous vehicle 12100, and traversing the portion of the vehicle transportation network in accordance with the orientation-adjust vehicle control action may reduce uncertainty regarding the right-of-way for the right-of-way overlap area 12500 by increasing the probability that the remote vehicle 12400 will yield right-of-way in response to the remote vehicle 12400 decelerating, or decreasing the probability that the remote vehicle 12400 will yield right-of-way in response to the remote vehicle 12400 accelerating.

In another example, the uncertainty may be based on an expected external uncertainty, which may indicate an expected uncertainty of an external object, such as the remote vehicle 12400, regarding an expected subsequent vehicle control action for the autonomous vehicle 12100 relative to the right-of-way for the right-of-way overlap area 12500. Traversing the portion of the vehicle transportation network in accordance with the orientation-adjust vehicle control action may reduce uncertainty regarding the right-of-way for the right-of-way overlap area 12500 by controlling the autonomous vehicle 12100 to output a semiotic representation, such as the orientation-adjust motion of the autonomous vehicle 12100, of an expected subsequent right-of-way and a corresponding expected subsequent vehicle control action for the autonomous vehicle 12100, such as a proceed vehicle control action to traverse the right-of-way overlap area 12500.

Traversing the portion of the vehicle transportation network in accordance with the orientation-adjust vehicle control action may include traversing the vehicle transportation network from a current location of the autonomous vehicle 12100 toward the subsequent merged lane 12230 by controlling the trajectory of the autonomous vehicle 12100 to adjust the relative orientation of the autonomous vehicle 12100 relative to the vehicle transportation network from an orientation substantially in the center of the current lane 12210 as shown, to an orientation in the current lane 12210 relatively near the adjacent lane 12220, which may be the closest location in the vehicle transportation network along the expected path 12110 for the autonomous vehicle 12100 to the right-of-way overlap area 12500 that the autonomous vehicle 12100 may safely traverse without entering the right-of-way overlap area 12500. Controlling the lateral lane-wise orientation of the autonomous vehicle 12100 may be performed in accordance with a defined lateral adjustment rate profile. Traversing the portion of the vehicle transportation network in accordance with the orientation-adjust vehicle control action may include traversing the vehicle transportation network from a current location of the autonomous vehicle 12100 toward the subsequent merged lane 12230 by controlling the velocity, such as by accelerating or decelerating.

Although not shown in FIG. 12, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 12100 may be located more proximate to the lateral center of the subsequent merged lane 12230 than the remote vehicle 12400, which may reduce or eliminate right-of-way ambiguity, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a decelerate vehicle control action. For example, the autonomous vehicle may determine that the autonomous vehicle 12100 is located more proximate to the lateral center of the subsequent merged lane 12230 than the remote vehicle 12400 and that the autonomous vehicle has right-of-way, and the scenario-specific operational control evaluation model policy may output a proceed vehicle control action. In another example, the autonomous vehicle may determine that the remote vehicle 12400 has right-of-way, or is otherwise proceeding through the merge intersection 12300, and that the autonomous vehicle does not currently have right-of-way, and the scenario-specific operational control evaluation model policy may output a decelerate vehicle control action.

Figure 13:
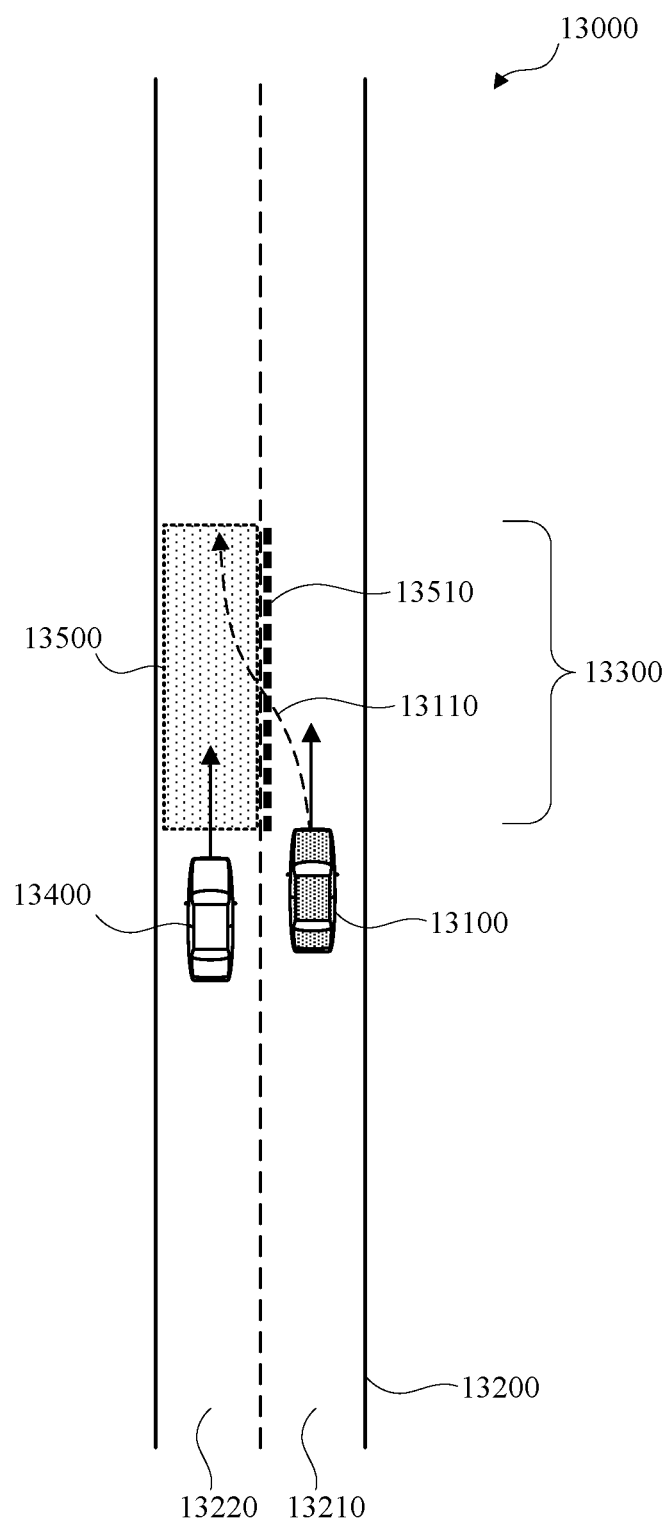
FIG. 13 is a diagram of an example of a lane-change scene portion of a vehicle transportation network including a lane-change scenario with right-of-way ambiguity in accordance with embodiments of this disclosure.

FIG. 13 is a diagram of an example of a lane-change scene 13000 portion of a vehicle transportation network including a lane-change scenario with right-of-way ambiguity in accordance with embodiments of this disclosure. Autonomous vehicle operational management may include an autonomous vehicle 13100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 13100 traversing a portion of the vehicle transportation network along a first road 13200 in a first lane 13210 and identifying a portion of the vehicle transportation network as a lane-change location 13300 for performing a lane-change (lane-change scenario). For simplicity and clarity, the portion of the vehicle transportation network corresponding to the lane-change scene 13000 shown in FIG. 13 is oriented with north at the top and east at the right.

The portion of the vehicle transportation network corresponding to the lane-change scene 13000 shown in FIG. 13 includes the autonomous vehicle 13100 traversing northward along a road segment in the first lane 13210 of the first road 13200, adjacent to a second lane 13220 of the first road 13200, approaching the identified lane-change location 13300. The lane-change location 13300 may be a relative location, relative to the location of the autonomous vehicle 13100.

A remote vehicle 13400 is traversing the second lane 13220, approaching the identified lane-change location 13300 substantially concurrently with the autonomous vehicle 13100, as shown, or may otherwise approach the identified lane-change location 13300 at a spatiotemporal location that is proximate to the spatiotemporal location of the autonomous vehicle 13100 such that the remote vehicle 13400 may affect the operation of the autonomous vehicle 13100 traversing the lane-change scenario, such as by blocking the autonomous vehicle 13100.

The autonomous vehicle operational management system of the autonomous vehicle 13100 may operate a lane-change monitor, such as the lane-change monitor 4240 shown in FIG. 4, which may include instantiating the lane-change monitor, which may be similar to operating an intersection monitor as described in relation to FIG. 6, except as indicated herein or otherwise clear from context. The autonomous vehicle operational management controller may detect or identify the lane-change scenario, such as based on the operational environment represented by the operational environment information, which may include the operational environment information output by the lane-change monitor. The autonomous vehicle operational management controller may instantiate, or update, one or more lane-change-SSOCEM instances and may send, or otherwise make available, the operational environment information to the lane-change-SSOCEM instances, in response to detecting or identifying lane-change scenario including the remote vehicle 13400. The lane-change-SSOCEM instances may be similar to intersection-SSOCEM instances as described in relation to FIG. 6, except as indicated herein or otherwise clear from context.

Instantiating the lane-change-SSOCEM instance may include identifying a solution or policy for a model of the lane-change vehicle operational scenario from the lane-change-SSOCEM. Identifying the solution or policy for the model of the lane-change vehicle operational scenario from the lane-change-SSOCEM may include solving the lane-change-SSOCEM model. Instantiating the lane-change-SSOCEM instance may include instantiating an instance of the solution or policy. The lane-change-SSOCEM solution instance may generate a candidate vehicle control action, such as 'maintain', 'orientation-adjust', or 'proceed', based on the respective modeled scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated SSOCEM instances and may identify a vehicle control action based on the received candidate vehicle control actions for controlling the autonomous vehicle 13100 at the corresponding temporal location and may control the autonomous vehicle to traverse the vehicle transportation network, or a portion thereof, in accordance with the identified vehicle control action.

For the lane-change scene 13000 shown in FIG. 13, the autonomous vehicle 13100 may approach the lane-change location 13300, such as at a speed in accordance with a defined speed limit, or in accordance with a prevailing traffic speed. The autonomous vehicle 13100 may identify a portion of the vehicle transportation network as a right-of-way overlap area 13500. Identifying the right-of-way overlap area 13500 may include identifying a right-of-way boundary location 13510, which may be a location in the vehicle transportation network along the expected path 13110 of the autonomous vehicle 13100 between a current location of the autonomous vehicle 13100 and the right-of-way overlap area 13500 proximate to, such as immediately adjacent to, the right-of-way overlap area 13500 which may be the closest location in the vehicle transportation network along the expected path 13110 for the autonomous vehicle 13100 to the right-of-way overlap area 13500 that the autonomous vehicle 13100 may safely traverse without entering the right-of-way overlap area 13500.

The scenario-specific operational control evaluation model policy may determine that the uncertainty of a current belief state for the distinct vehicle operational scenario exceeds a defined uncertainty threshold. For example, the autonomous vehicle 13100 and the remote vehicle 13400 may approach the lane-change intersection 13300 substantially concurrently, which may increase uncertainty regarding the right-of-way for the right-of-way overlap area 13500.

The scenario-specific operational control evaluation model policy may output an orientation-adjust vehicle control action. The autonomous vehicle 13100 may traverse a portion of the vehicle transportation network in accordance with the orientation-adjust vehicle control action, which may include traversing the vehicle transportation network from a current location of the autonomous vehicle 13100 toward adjacent lane 13220. Traversing the portion of the vehicle transportation network in accordance with the orientation-adjust vehicle control action may reduce uncertainty regarding the right-of-way for the right-of-way overlap area 13500.

For example, the uncertainty may be based on uncertainty regarding whether the remote vehicle 13400 (external object) will yield right-of-way (expected operation) to the autonomous vehicle 13100, and traversing the portion of the vehicle transportation network in accordance with the orientation-adjust vehicle control action may reduce uncertainty regarding the right-of-way for the right-of-way overlap area 13500 by increasing the probability that the remote vehicle 13400 will yield right-of-way in response to the remote vehicle 13400 decelerating, or decreasing the probability that the remote vehicle 13400 will yield right-of-way in response to the remote vehicle 13400 accelerating or otherwise maintaining a blocking relative orientation to the autonomous vehicle 13100.

In another example, the uncertainty may be based on an expected external uncertainty, which may indicate an expected uncertainty of an external object, such as the remote vehicle 13400, regarding an expected subsequent vehicle control action for the autonomous vehicle 13100 relative to the right-of-way for the right-of-way overlap area 13500. Traversing the portion of the vehicle transportation network in accordance with the orientation-adjust vehicle control action may reduce uncertainty regarding the right-of-way for the right-of-way overlap area 13500 by controlling the autonomous vehicle 13100 to output a semiotic representation, such as the orientation-adjust motion of the autonomous vehicle 13100, of an expected subsequent right-of-way and a corresponding expected subsequent vehicle control action for the autonomous vehicle 13100, such as a proceed vehicle control action to traverse the right-of-way overlap area 13500.

Traversing the portion of the vehicle transportation network in accordance with the orientation-adjust vehicle control action may include traversing the vehicle transportation network from a current location of the autonomous vehicle 13100 toward the adjacent lane 13220 by controlling the trajectory of the autonomous vehicle 13100 to adjust the relative orientation of the autonomous vehicle 13100 relative to the vehicle transportation network from an orientation substantially in the center of the current lane 13210 as shown, to an orientation in the current lane 13210 relatively near the adjacent lane 13220, which may be the closest location in the vehicle transportation network along the expected path 13110 for the autonomous vehicle 13100 to the right-of-way overlap area 13500 that the autonomous vehicle 13100 may safely traverse without entering the right-of-way overlap area 13500. Controlling the lateral lane-wise orientation (directional state change) of the autonomous vehicle 13100 may be performed in accordance with a defined lateral adjustment rate profile.

Although not shown in FIG. 13, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 13100 may be located more proximate to the lateral center of the adjacent lane 13220 than the remote vehicle 13400, which may reduce or eliminate right-of-way ambiguity, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a decelerate vehicle control action. For example, the autonomous vehicle may determine that the autonomous vehicle 13100 is located more proximate to the lateral center of the adjacent lane 13220 than the remote vehicle 13400 and that the autonomous vehicle has rightof-way, and the scenario-specific operational control evaluation model policy may output a proceed vehicle control action. In another example, the autonomous vehicle may determine that the remote vehicle 13400 has right-of-way, or is otherwise proceeding through the lane-change intersection 13300, and that the autonomous vehicle does not currently have right-of-way, and the scenario-specific operational control evaluation model policy may output a decelerate vehicle control action.

Figure 14:
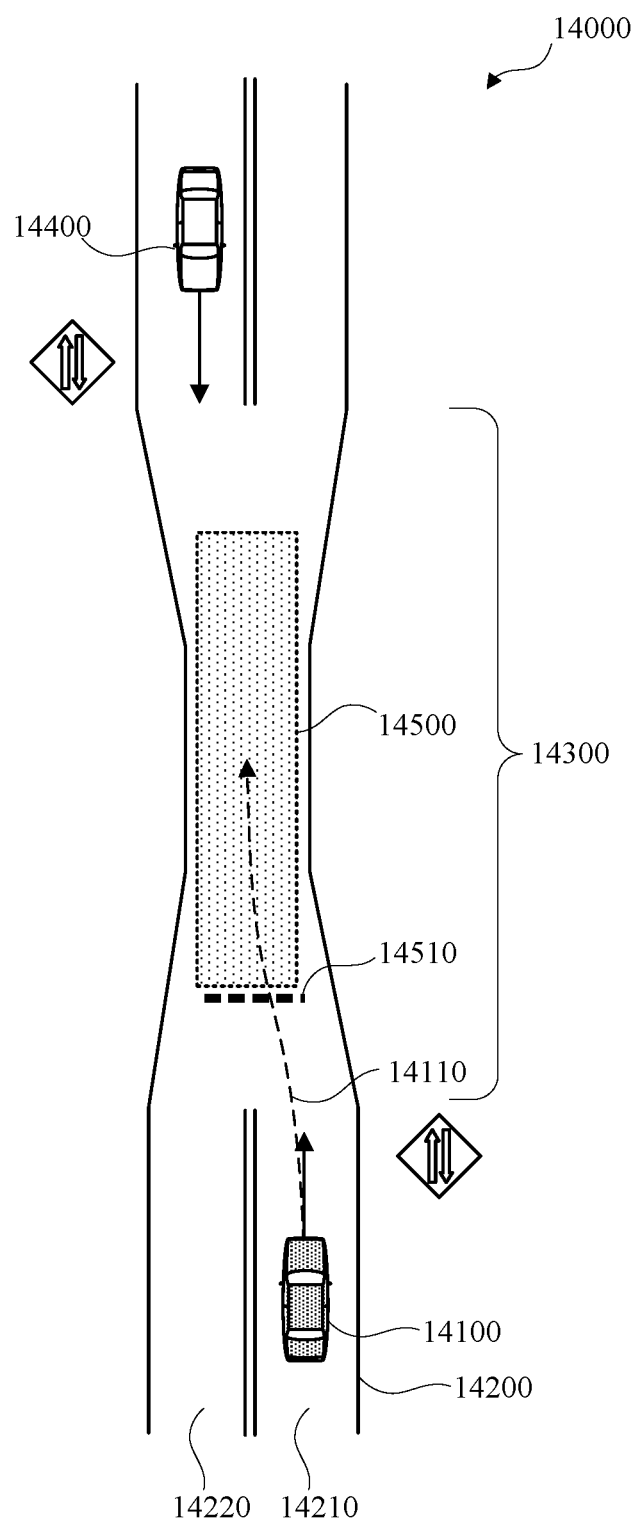
FIG. 14 is a diagram of an example of a lane-overlap scene portion of a vehicle transportation network including a lane-overlap vehicle operational scenario with right-of-way ambiguity in accordance with embodiments of this disclosure.

FIG. 14 is a diagram of an example of a lane-overlap scene 14000 portion of a vehicle transportation network including a lane-overlap vehicle operational scenario with right-of-way ambiguity in accordance with embodiments of this disclosure. Autonomous vehicle operational management may include an autonomous vehicle 14100, such as the vehicle 1000 shown in FIG. 1, one of the vehicles 2100/2110 shown in FIG. 2, a semi-autonomous vehicle, or any other vehicle implementing autonomous driving, operating an autonomous vehicle operational management system, such as the autonomous vehicle operational management system 4000 shown in FIG. 4 or the autonomous vehicle operational management system 5000 shown in FIG. 5, which may include a model of an autonomous vehicle operational control scenario that includes the autonomous vehicle 14100 traversing a portion of the vehicle transportation network along a first road 14200 in a first lane 14210 adjacent to a second lane 14220 having an opposite direction of travel, approaching a lane-overlap (two-way) location 14300 of the vehicle transportation network wherein lanes having opposing directions of travel overlap (lane-overlap vehicle operational scenario). For simplicity and clarity, the portion of the vehicle transportation network corresponding to the lane-overlap scene 14000 shown in FIG. 14 is oriented with north at the top and east at the right.

The portion of the vehicle transportation network corresponding to the lane-overlap scene 14000 shown in FIG. 14 includes the autonomous vehicle 14100 traversing northward along a road segment in the first lane 14210 of the first road 14200, adjacent to a second lane 14220, approaching the lane-overlap location 14300. A remote vehicle 14400 is traversing southward in the second lane 14220, approaching the lane-overlap location 14300.

The autonomous vehicle operational management system of the autonomous vehicle 14100 may operate a lane-overlap monitor which may include instantiating the lane-overlap monitor, which may be similar to operating an intersection monitor as described in relation to FIG. 6, except as indicated herein or otherwise clear from context. The autonomous vehicle operational management controller may detect or identify the lane-overlap vehicle operational scenario, such as based on the operational environment represented by the operational environment information, which may include the operational environment information output by the lane-overlap monitor. The autonomous vehicle operational management controller may instantiate, or update, one or more lane-overlap-SSOCEM instances and may send, or otherwise make available, the operational environment information to the lane-overlap-SSOCEM instances, in response to detecting or identifying lane-overlap vehicle operational scenario including the remote vehicle 14400. The lane-overlap-SSOCEM instances may be similar to intersection-SSOCEM instances as described in relation to FIG. 6, except as indicated herein or otherwise clear from context.

Instantiating the lane-overlap-SSOCEM instance may include identifying a solution or policy for a model of the lane-overlap vehicle operational scenario from the lane-overlap-SSOCEM. Identifying the solution or policy for the model of the lane-overlap vehicle operational scenario from the lane-overlap-SSOCEM may include solving the lane-overlap-SSOCEM model. Instantiating the lane-overlap-SSOCEM instance may include instantiating an instance of the solution or policy. The lane-overlap-SSOCEM solution instance may generate a candidate vehicle control action, such as 'stop', 'orientation-adjust', or 'proceed', based on the respective modeled vehicle operational scenario and the corresponding operational environment information, and may output the respective candidate vehicle control action to the autonomous vehicle operational management controller, such as by sending the respective candidate vehicle control action to the autonomous vehicle operational management controller or storing the respective candidate vehicle control action for access by the autonomous vehicle operational management controller.

The autonomous vehicle operational management controller may receive candidate vehicle control actions from the respective instantiated SSOCEM instances and may identify a vehicle control action based on the received candidate vehicle control actions for controlling the autonomous vehicle 14100 at the corresponding temporal location and may control the autonomous vehicle to traverse the vehicle transportation network, or a portion thereof, in accordance with the identified vehicle control action.

For the lane-overlap scene 14000 shown in FIG. 14, the autonomous vehicle 14100 may approach the lane-overlap location 14300. Substantially concurrently, the remote vehicle 14400 may approach the lane-overlap location 14300. The autonomous vehicle 14100 may identify a portion of the vehicle transportation network as a right-of-way overlap area 14500. Identifying the right-of-way overlap area 14500 may include identifying a right-of-way boundary location 14510, which may be a location in the vehicle transportation network along the expected path 14110 of the autonomous vehicle 14100 between a current location of the autonomous vehicle 14100 and the right-of-way overlap area 14500 proximate to, such as immediately adjacent to, the right-of-way overlap area 14500 which may be the closest location in the vehicle transportation network along the expected path 14110 for the autonomous vehicle 14100 to the right-of-way overlap area 14500 that the autonomous vehicle 14100 may safely traverse without entering the right-of-way overlap area 14500.

The scenario-specific operational control evaluation model policy may determine that the uncertainty of a current belief state for the distinct vehicle operational scenario exceeds a defined uncertainty threshold. For example, the autonomous vehicle 14100 and the remote vehicle 14400 may approach the lane-overlap intersection 14300 substantially concurrently, which may increase uncertainty regarding the right-of-way for the right-of-way overlap area 14500.

The scenario-specific operational control evaluation model policy may output an orientation-adjust vehicle control action. The autonomous vehicle 14100 may traverse a portion of the vehicle transportation network in accordance with the orientation-adjust vehicle control action. Traversing the portion of the vehicle transportation network in accordance with the orientation-adjust vehicle control action may reduce uncertainty regarding the right-of-way for the right-of-way overlap area 14500.

For example, the uncertainty may be based on uncertainty regarding whether the remote vehicle 14400 (external object) will yield right-of-way (expected operation) to the autonomous vehicle 14100, and traversing the portion of the vehicle transportation network in accordance with the orientation-adjust vehicle control action may reduce uncertainty regarding the right-of-way for the right-of-way overlap area 14500 by increasing the probability that the remote vehicle 14400 will yield right-of-way in response to the remote vehicle 14400 remaining or becoming stationary, or decreasing the probability that the remote vehicle 14400 will yield right-of-way in response to the remote vehicle 14400 traversing the lane-overlap location 14300.

In another example, the uncertainty may be based on an expected external uncertainty, which may indicate an expected uncertainty of an external object, such as the remote vehicle 14400, regarding an expected subsequent vehicle control action for the autonomous vehicle 14100 relative to the right-of-way for the right-of-way overlap area 14500. Traversing the portion of the vehicle transportation network in accordance with the orientation-adjust vehicle control action may reduce uncertainty regarding the right-of-way for the right-of-way overlap area 14500 by controlling the autonomous vehicle 14100 to output a semiotic representation, such as the orientation-adjust motion of the autonomous vehicle 14100, of an expected subsequent right-of-way and a corresponding expected subsequent vehicle control action for the autonomous vehicle 14100, such as a proceed vehicle control action to traverse the right-of-way overlap area 14500.

Traversing the portion of the vehicle transportation network in accordance with the orientation-adjust vehicle control action may include traversing the vehicle transportation network from a current location of the autonomous vehicle 14100 toward the boundary location 14510 at a speed within, such as at or below, a defined maximum orientation-adjust speed, such as two meters per second.

Traversing the vehicle transportation network in accordance with the orientation-adjust vehicle control action may include determining whether a distance between the current location of the autonomous vehicle 14100 and the right-of-way boundary location 14510 is within, such as equal to or less than, an expected distance-to-stationary. For example, the autonomous vehicle 14100 may determine that the distance between the current location of the autonomous vehicle 14100 and the right-of-way boundary location 14510 is within the expected distance-to-stationary and the autonomous vehicle 14100 may traverse the vehicle transportation network by decelerating in accordance with a defined deceleration profiled to stop at, or proximate to, the boundary location 14510. The expected distance-to-stationary may indicate a determined distance for the autonomous vehicle 14100 to transition from an in-motion state to a stationary state. In some implementations, the autonomous vehicle 14100 may determine that a current location of the autonomous vehicle corresponds with the right-of-way boundary location, and the autonomous vehicle 14100 may traverse the vehicle transportation network by controlling the autonomous vehicle 14100 to be stationary (stopping).

Although not shown in FIG. 14, subsequent to traversing a portion of the vehicle transportation network in accordance with the orientation-adjust vehicle control action, the scenario-specific operational control evaluation model policy may determine that the uncertainty of a current belief state for the distinct vehicle operational scenario is within the defined uncertainty threshold. For example, subsequent to traversing a portion of the vehicle transportation network in accordance with the orientation-adjust vehicle control action the autonomous vehicle 14100 may be located more proximate to lane-overlap intersection 14300 than the remote vehicle 14400, which may reduce or eliminate right-of-way ambiguity, and the scenario-specific operational control evaluation model policy may determine that the uncertainty of a current belief state for the distinct vehicle operational scenario is within the defined uncertainty threshold.

In response to determining that the uncertainty value for the distinct vehicle operational scenario is within the defined uncertainty threshold, the scenario-specific operational control evaluation model policy may output a proceed vehicle control action or a decelerate vehicle control action. For example, the autonomous vehicle 14100 may determine that the autonomous vehicle 14100 is located more proximate to the lane-overlap intersection 14300 than the remote vehicle 14400 and that the autonomous vehicle has right-of-way, and the scenario-specific operational control evaluation model policy may output a proceed vehicle control action. In another example, the autonomous vehicle may determine that the remote vehicle 14400 has right-of-way, or is otherwise proceeding through the lane-overlap intersection 14300, and that the autonomous vehicle does not currently have right-of-way, and the scenario-specific operational control evaluation model policy may output a stop or wait vehicle control action.

Although described with respect to an autonomous vehicle including an autonomous vehicle operational management system, such as the autonomous vehicle operational management system 4000 shown in FIG. 4, traversing a portion of a vehicle transportation network in accordance with an orientation-adjust vehicle control action may be implemented in other autonomous vehicle, or semi-autonomous vehicle, configurations.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
    traversing, by an autonomous vehicle, a vehicle transportation network, wherein traversing the vehicle transportation network includes:
        operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model;
        receiving a candidate vehicle control action from the policy for the scenario-specific operational control evaluation module instance, wherein:
            in response to a determination that an uncertainty value for the distinct vehicle operational scenario exceeds a defined uncertainty threshold, the candidate vehicle control action is an orientation-adjust vehicle control action; and
        traversing a portion of the vehicle transportation network in accordance with the candidate vehicle control action, wherein the portion of the vehicle transportation network includes the distinct vehicle operational scenario, and wherein traversing the vehicle transportation network in accordance with the candidate vehicle control action includes:
            identifying a right-of-way boundary location in the vehicle transportation network; and
            in response to a determination that a distance between the autonomous vehicle and the right-of-way boundary location is within a defined approach distance, controlling the autonomous vehicle to traverse the portion of the vehicle transportation network at a maximum orientation-adjust speed.

2. The method of claim 1, wherein controlling the autonomous vehicle to traverse the vehicle transportation network at the maximum orientation-adjust speed includes:
    in response to a determination that the maximum orientation-adjust speed exceeds a current speed of the autonomous vehicle, controlling the autonomous vehicle to accelerate to the maximum orientation-adjust speed; and
    in response to a determination that the current speed of the autonomous vehicle exceeds the maximum orientation-adjust speed, controlling the autonomous vehicle to decelerate to the maximum orientation-adjust speed.

3. The method of claim 1, wherein traversing the vehicle transportation network in accordance with the candidate vehicle control action includes in response to a determination that a distance between the autonomous vehicle and the right-of-way boundary location is within an expected distance-to-stationary, controlling the autonomous vehicle to traverse the vehicle transportation network by decelerating.

4. The method of claim 3, wherein traversing the vehicle transportation network in accordance with the candidate vehicle control action includes in response to a determination that a current location of the autonomous vehicle corresponds with the right-of-way boundary location, controlling the autonomous vehicle to traverse the vehicle transportation network by stopping.

5. The method of claim 1, wherein traversing the vehicle transportation network includes:
    receiving a subsequent candidate vehicle control action from the policy for the scenario-specific operational control evaluation module instance, wherein:
        in response to a determination that the uncertainty value for the distinct vehicle operational scenario is within the defined uncertainty threshold, the subsequent candidate vehicle control action is a proceed vehicle control action or a stop vehicle control action; and
    traversing a subsequent portion of the vehicle transportation network in accordance with the subsequent candidate vehicle control action, wherein the subsequent portion of the vehicle transportation network includes the distinct vehicle operational scenario.

6. The method of claim 1, wherein the determination that the uncertainty value for the distinct vehicle operational scenario exceeds the defined uncertainty threshold corresponds with an occluded area, and wherein traversing the portion of the vehicle transportation network in accordance with the candidate vehicle control action includes traversing the portion of the vehicle transportation network in accordance with the candidate vehicle control action such that the occluded area is reduced.

7. The method of claim 1, wherein the determination that the uncertainty value for the distinct vehicle operational scenario exceeds the defined uncertainty threshold is based on an uncertainty for an expected operation of an external object, and wherein traversing the portion of the vehicle transportation network in accordance with the candidate vehicle control action includes traversing the portion of the vehicle transportation network in accordance with the candidate vehicle control action such that the uncertainty for the expected operation of the external object is reduced.

8. The method of claim 1, wherein the determination that the uncertainty value for the distinct vehicle operational scenario exceeds the defined uncertainty threshold is based on an expected external uncertainty, and wherein traversing the portion of the vehicle transportation network in accordance with the candidate vehicle control action includes traversing the portion of the vehicle transportation network in accordance with the candidate vehicle control action such that the expected external uncertainty is reduced by controlling the autonomous vehicle to output a semiotic representation of an expected subsequent vehicle control action for the autonomous vehicle.

9. The method of claim 8, wherein controlling the autonomous vehicle to output the semiotic representation of the expected subsequent vehicle control action for the autonomous vehicle includes controlling at least one of a directional state of the autonomous vehicle or a kinetic state of the autonomous vehicle.

10. The method of claim 1, wherein the distinct vehicle operational scenario is an intersection scenario, a pedestrian scenario, a merge scenario, a lane change scenario, or a lane-overlap scenario.

11. An autonomous vehicle comprising:
a processor configured to execute instructions stored on a non-transitory computer readable medium to:
  operate a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model;
  receive a candidate vehicle control action from the policy for the scenario-specific operational control evaluation module instance, wherein:
    in response to a determination that an uncertainty value for the distinct vehicle operational scenario exceeds a defined uncertainty threshold, the candidate vehicle control action is an orientation-adjust vehicle control action; and
  traverse a portion of a vehicle transportation network in accordance with the candidate vehicle control action, wherein the portion of the vehicle transportation network includes the distinct vehicle operational scenario by:
    identifying a right-of-way boundary location in the vehicle transportation network; and
    in response to a determination that a distance between the autonomous vehicle and the right-of-way boundary location is within a defined approach distance, controlling the autonomous vehicle to traverse the portion of the vehicle transportation network at a maximum orientation-adjust speed.

12. The autonomous vehicle of claim 11, wherein the processor is configured to:
generate the determination that the uncertainty value for the distinct vehicle operational scenario exceeds the defined uncertainty threshold in response to information indicating at least one of an occluded area, an expected operation of an external object, or an expected external uncertainty; and
traverse the portion of the vehicle transportation network in accordance with the candidate vehicle control action by:
  traversing the portion of the vehicle transportation network in accordance with the candidate vehicle control action such that the uncertainty for the expected operation of the external object is reduced;
  traversing the portion of the vehicle transportation network in accordance with the candidate vehicle control action such that the expected external uncertainty is reduced by controlling the autonomous vehicle to output a semiotic representation of an expected subsequent vehicle control action for the autonomous vehicle; and
  in response to the information indicating the occluded area, traversing the portion of the vehicle transportation network in accordance with the candidate vehicle control action such that the occluded area is reduced.

13. The autonomous vehicle of claim 11, wherein controlling the autonomous vehicle to traverse the vehicle transportation network at the maximum orientation-adjust speed includes:
in response to a determination that the maximum orientation-adjust speed exceeds a current speed of the autonomous vehicle, controlling the autonomous vehicle to accelerate to the maximum orientation-adjust speed; and
in response to a determination that the current speed of the autonomous vehicle exceeds the maximum orientation-adjust speed, controlling the autonomous vehicle to decelerate to the maximum orientation-adjust speed.

14. The autonomous vehicle of claim 11, wherein the processor is configured to execute the instructions stored on the non-transitory computer readable medium to traverse the vehicle transportation network in accordance with the candidate vehicle control action by, in response to a determination that a distance between the autonomous vehicle and the right-of-way boundary location is within an expected distance-to-stationary, controlling the autonomous vehicle to traverse the vehicle transportation network by decelerating.

15. The autonomous vehicle of claim 11, wherein the processor is configured to execute the instructions stored on the non-transitory computer readable medium to traverse the vehicle transportation network in accordance with the candidate vehicle control action by, in response to a determination that a current location of the autonomous vehicle corresponds with the right-of-way boundary location, controlling the autonomous vehicle to traverse the vehicle transportation network by stopping.

16. A method for use in traversing a vehicle transportation network, the method comprising:
- traversing, by an autonomous vehicle, a vehicle transportation network, wherein traversing the vehicle transportation network includes:
  - operating a scenario-specific operational control evaluation module instance, wherein the scenario-specific operational control evaluation module instance includes an instance of a scenario-specific operational control evaluation model of a distinct vehicle operational scenario, and wherein operating the scenario-specific operational control evaluation module instance includes identifying a policy for the scenario-specific operational control evaluation model;
  - receiving a candidate vehicle control action from the policy for the scenario-specific operational control evaluation module instance, wherein:
    - in response to a determination that an uncertainty value for the distinct vehicle operational scenario exceeds a defined uncertainty threshold, the candidate vehicle control action is an orientation-adjust vehicle control action; and
    - traversing a portion of the vehicle transportation network in accordance with the candidate vehicle control action, wherein the portion of the vehicle transportation network includes the distinct vehicle operational scenario, and wherein traversing the portion of the vehicle transportation network in accordance with the candidate vehicle control action includes:
      - in response to a determination that a distance between the autonomous vehicle and the right-of-way boundary location is within a defined approach distance, controlling the autonomous vehicle to traverse the portion of the vehicle transportation network at a maximum orientation-adjust speed;
      - in response to a determination that the distance between the autonomous vehicle and a right-of-way boundary location is within an expected distance-to-stationary, controlling the autonomous vehicle to traverse the vehicle transportation network by decelerating, and
      - in response to a determination that a current location of the autonomous vehicle corresponds with the right-of-way boundary location, controlling the autonomous vehicle to traverse the vehicle transportation network by stopping.

* * * * *